(12) United States Patent
Inoue et al.

(10) Patent No.: US 7,244,060 B2
(45) Date of Patent: Jul. 17, 2007

(54) KNEADING APPARATUS

(75) Inventors: Kimio Inoue, Kobe (JP); Masao Murakami, Takasago (JP); Norifumi Yamada, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 96 days.

(21) Appl. No.: 10/303,763

(22) Filed: Nov. 26, 2002

(65) Prior Publication Data

US 2003/0128624 A1    Jul. 10, 2003

(30) Foreign Application Priority Data

Nov. 29, 2001 (JP) ............................. 2001-364053
Jan. 17, 2002 (JP) ............................. 2002-008782
Feb. 21, 2002 (JP) ............................. 2002-044316

(51) Int. Cl.
*B29B 7/20* (2006.01)
(52) U.S. Cl. .................... 366/76.3; 366/85; 366/88; 366/90
(58) Field of Classification Search ............... 366/76.5, 366/77, 83–85, 90, 76.4, 76.3, 88; 425/204, 425/208, 209, 587
See application file for complete search history.

(56) References Cited

U.S. PATENT DOCUMENTS

| | | | | |
|---|---|---|---|---|
| 3,941,535 A | * | 3/1976 | Street | 425/208 |
| 4,848,915 A | * | 7/1989 | Fintel | 366/76.2 |
| 5,947,593 A | * | 9/1999 | Inoue et al. | 366/85 |
| 5,984,516 A | * | 11/1999 | Inoue et al. | 366/85 |
| 6,062,719 A | | 5/2000 | Busby et al. | |
| 6,106,142 A | * | 8/2000 | Rockstedt | 366/85 |
| 6,116,770 A | * | 9/2000 | Kiani et al. | 366/82 |
| 6,170,975 B1 | | 1/2001 | Andersen | |
| 6,220,745 B1 | | 4/2001 | Kobayashi et al. | |
| 6,682,213 B2 | * | 1/2004 | Inoue et al. | 366/76.4 |
| 2001/0019729 A1 | * | 9/2001 | Inoue | 425/204 |
| 2003/0090955 A1 | * | 5/2003 | Murakami et al. | 366/76.2 |

FOREIGN PATENT DOCUMENTS

| | | |
|---|---|---|
| DE | 0 850 738 A2 | 1/1998 |
| JP | 6-344344 | 12/1994 |
| JP | 10-80944 | 3/1998 |
| JP | 11-262945 | 9/1999 |

\* cited by examiner

*Primary Examiner*—David Sorkin
(74) *Attorney, Agent, or Firm*—Oblon, Spivak, McClelland, Maier & Neustadt, P.C.

(57) ABSTRACT

A kneading apparatus includes a barrel having a chamber, which is a tubular hollow, a biaxial screw set for extruding a material to be kneaded downstream by rotation of the biaxial screw set inside the chamber, and kneading blade sections, mounted in the screw set, for kneading the material by shearing the material in tip clearances and a wedge-shaped space between an inside wall of the chamber and the kneading blade sections. The tip clearance becomes narrower from the upstream side to the downstream side in the direction of extrusion of the material. The kneading apparatus, which performs a continuous kneading operation, makes it possible to set proper kneading conditions in accordance with changes in the state of a material being continuously kneaded, and achieves high kneading efficiency.

17 Claims, 12 Drawing Sheets

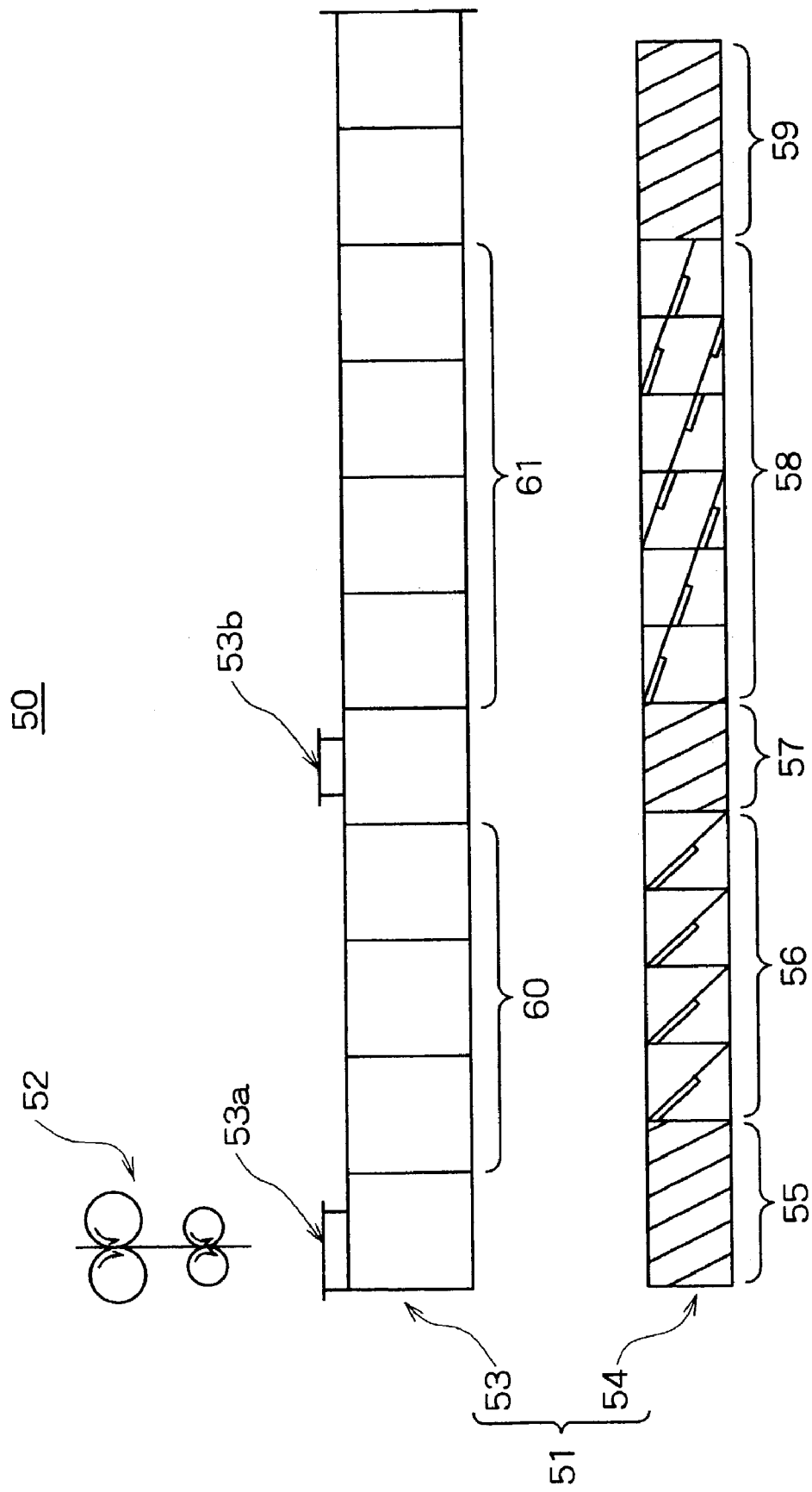

KNEADING APPARATUS

BACKGROUND OF THE INVENTION

1. Field of the Invention

The present invention relates to an apparatus and method for kneading rubber or a rubber composition. The apparatus and method are used for masticating rubber to improve flowability/processability of the rubber and for kneading a material including rubber and various compound agents.

2. Description of the Related Art

In producing a kneaded material of a rubber composition including rubber and various compound agents, in particular, in producing a tire rubber compound primarily made up of natural rubber, a batch method for continuously kneading a predetermined amount of raw material once is often used. In this case, the batch-type kneading operation is repeated until formability in, for example, an extrusion process and dispersibility of compound agents reach desired levels, that is, until a desired viscosity level and a dispersibility level are reached. This kneading process is usually called a re-mill process, in which a batch-type kneading apparatus, such as an internal mixer, is used.

However, when kneading is carried out using such a batch-type kneading apparatus, after the kneading step, the material needs to be transported from the kneading apparatus to an extruder using, for example, a transporter in order to form the material into a predetermined shape, so that a step for transporting a lump of kneaded material is required. Therefore, the kneading apparatus tends to become more sophisticated and larger, and manual operation of a worker needs to be relied on, so that labor cannot be saved. In kneading using a batch-type kneading apparatus, in order to prevent deterioration of the material and to increase kneading efficiency, it is necessary to prevent the temperature from becoming too high during kneading, so that, ordinarily, a once-kneaded lump of material is formed in a sheet and cooled in order to re-mill the material again. The re-mill step is carried out until the viscosity is reduced to a desired viscosity. The re-mill step is often carried out up to approximately five times. Therefore, this is not desirable from the viewpoint of increasing productivity.

A kneading apparatus of a rubber composition for continuously kneading the material from the viewpoint of increasing productivity and the like is disclosed in Japanese Unexamined Patent Application Publication No. 11-262945. In the kneading apparatus, a double screw extruder, which is a typical example of a kneading extruder of a plastic composition, is used to knead rubber. An opening for putting in rubber is provided in the double screw extruder, and an extruder for supplying rubber is connected to the opening. While continuously supplying a rubber composition, the rubber composition is continuously kneaded by the double screw kneading extruder.

Therefore, in the continuous kneading apparatus disclosed in the aforementioned document, adjustment of the kneading state, that is the viscosity level and the level of dispersibility of compound agents is limited to a range which can be achieved by rotation of the double screw extruder, so that it is difficult to adjust the viscosity and the dispersibility of, for example, a high-viscosity rubber composition like that adjusted by the batch-type kneading apparatus. During kneading with the double screw extruder, the kneading state changes when, for example, the temperature increases or shearing is accelerated as the kneading operation progresses. It is, as a matter of course, difficult to properly set the kneading conditions in accordance with changes in the state of the material which is being kneaded.

SUMMARY OF THE INVENTION

Accordingly, in view of the above-described circumstances, it is an object of the present invention to provide a kneading apparatus which makes it possible to adjust the viscosity and dispersibility of compound agents for continuously kneading high-viscosity rubber or rubber composition, and to set proper kneading conditions with changes in the state of a material that is being continuously kneaded in order to achieve high kneading efficiency.

To overcome the above-described problems, there is provided a kneading apparatus for kneading by fluidizing a material to be kneaded under a shearing force to obtain a kneaded product in a desired kneaded state comprising a barrel having a chamber which is a tubular hollow, a biaxial screw set which rotates for extruding the material to be kneaded downstream inside the chamber and a kneading blade section mounted in the screw set for kneading the material to be kneaded by shearing the material in tip clearances and a wedge-shaped space between an inside wall of the chamber and the kneading blade section, wherein the tip clearances become narrower from the upstream side to the downstream side in the direction of extrusion of the material.

According to this structure, even if the material to be kneaded has high viscosity, it is possible to adjust the viscosity and dispersibility of compound agents in order to continuously knead the material by shearing it at the tip clearances and the wedge-shaped space between the kneading blade section and the inside wall of the chamber. In addition, ordinarily, as the kneading progresses, viscosity is reduced by shearing or due to an increase in temperature by heating. However, since the tip clearances are formed so as to become narrower from the upstream side to the downstream side in the direction of extrusion of the material to be kneaded, the tip clearances make it possible to provide a proper shearing force in accordance with changes in the viscosity of the material being continuously kneaded. In other words, it is possible to set proper kneading conditions in accordance with changes in the state of the material being kneaded, so that a continuous kneading apparatus which can provide excellent kneading efficiency can be provided.

In the kneading apparatus, a rotor segment having two or three helical blades can be used as the kneading blade section, wherein the tip clearance between the inside wall of the chamber and at least one helical blade is narrower than the tip clearance between the inside wall of the chamber and the other (another) helical blade.

According to this structure, the use of a rotor segment makes it possible to adjust the viscosity and dispersibility of compound agents for continuously kneading high-viscosity rubber or rubber composition and to achieve high kneading efficiency. The tip clearance formed by one helical blade is narrower than the tip clearance formed by the other (another) helical blade, so that, even if a rotor segment is continuously mounted, it is possible to, during kneading, prevent a screw shaft from flexing greatly and the center of the shaft from shifting, so that partial wearing of and damage to the rotor segment can be prevented. The one helical blade forming the narrow tip clearance makes it possible to prevent the material from adhering to the inside wall of the chamber, so that cooling of a kneaded material is accelerated and an increase in the temperature of the material being kneaded is restricted, and so that the material being kneaded does not build up inside the barrel.

In the kneading apparatus, the kneading blade section can be divided into a plurality of zones.

According to this structure, selection of various segments forming the zones of the kneading blade section makes it possible to minutely set kneading conditions in accordance with changes in the state of the material being kneaded.

The kneading apparatus can further comprise a cooling path provided inside the barrel and around the chamber.

In the kneading apparatus, the kneading blade section can comprise a helical blade having a partly cut away top portion and a length in the axial direction which is equal to or greater than the outside diameter of the screw set, and the kneading blade section is, at the downstream side, adjacent to another segment member having a portion whose axial cross sectional form changes discontinuously.

According to this structure, at the downstream side, the kneading blade section is adjacent to another segment having an axial cross sectional form which changes discontinuously, so that the discontinuous portion resists transportation of the material, as a result of which the material fills the upstream side of the discontinuous portion. The material which has filled the upstream side of the discontinuous portion in this way is sufficiently kneaded by the kneading blade section. On the other hand, since it is possible to cause the material to be filled at the discontinuous portion so that a predetermined amount of it is stopped thereat, the material is not pushed back upstream, so that the material does not build up excessively. Therefore, problems such as the material tending to remain in the chamber ever after kneading, the material to be kneaded tending to deteriorate due to high temperature, and the kneading efficiency tending to be reduced do not easily occur.

In addition, since the top portion of the helical blade of the kneading blade section has a cutaway portion, the material can easily pass by the cutaway portion and kneading at the portion of the helical blade where the cutaway portion is not provided is accelerated. In other words, the material can be sufficiently kneaded at the portion where the cutaway portion is not provided. The cutaway portion can cause the flowing state of the material inside the chamber to become complicated and distribution mixing and dispersive mixing of compound agents to be efficiently carried out. Further, making the length of the helical blade equal to or greater than the outside diameter of the screw set makes it possible to assuredly prevent uneven distribution of the material and efficiently mix the compound agents.

Therefore, it is possible to provide a kneading apparatus which makes it possible to prevent excessive building up of the material being kneaded inside the chamber and to sufficiently knead the material.

In the kneading apparatus, the kneading blade section can have a screw lead having a length which is equal to or greater than five times the outside diameter of the screw set.

According to this structure, since the length of the screw lead is equal to or greater than five times the outside diameter of the screw set (the length of the screw lead is equal to or greater than 5D), the screw lead provides a weaker transportation force in the extrusion direction of the material compared to a generally used screw, so that the material fills the inside of the chamber in order to make it possible to provide a sufficiently long filled portion for stably holding the screw set. Therefore, it is possible to prevent reduced facility life due to, for example, wearing caused by contact of the barrel and the screw set.

In the kneading apparatus, the another segment member adjacent to the kneading blade section at the downstream side has a length in the axial direction which is equal to or greater than ½ of the outside diameter of the screw set, and a plurality of segments having blades whose top portions are parallel to the axis of the screw set are combined so that their axial cross sectional forms are alternately shifted by 90° from the axial center of the screw.

According to this structure, since a plurality of segments are combined by alternately shifting their axial cross sectional forms by 90° with respect to the axial center, the segment members themselves do not feed and return the material. Therefore, it is possible to reliably cause the material to fill the chamber so that a required amount of it is stopped. In addition, since the length of the other (another) segment is equal to or greater than ½ of the outside diameter of the screw set, it is possible to stably stop the required amount of material.

The kneading apparatus can further comprise a pusher for forcefully supplying the material to be kneaded into the chamber, wherein a plurality of supply openings is provided in the barrel towards the inside of the chamber and in the vicinity of a blade of the screw set.

According to this structure, when materials are supplied into the barrel from the plurality of supply openings, the materials supplied from the supply openings have sectional areas corresponding to the areas of the respective supply openings, so that, even if a large amount of material is supplied into the barrel at one time from all of the supply openings as a whole or even if hard materials are used, the materials are cut by the screw blade without the material exerting a large pushing force upon an end surface of the screw blade. As a result, the screw does not flex due to the large pushing force, so that, for example, the screw blade does not rub against an inside wall surface of the barrel. Therefore, it is possible to supply and knead a large amount of material without limiting the types of materials for kneading.

The pusher can be directly connected to the barrel or indirectly connected to the barrel through a material flow path. Supply holes may be formed in the barrel. The kneading apparatus can be either a uniaxial or a biaxial type.

Alternatively, the kneading apparatus can further comprise a pusher for forcefully supplying the material to be kneaded into the chamber and a removably provided connecting mechanism for connecting the pusher and the barrel, said connecting mechanism having a supply opening member integrally or separably formed thereat, said supply opening member having the plurality of supply openings opening in the vicinity of a blade of the screw set.

According to this structure, when materials are supplied into the barrel from the plurality of supply openings, the materials are cut by the blade of the screw, so that it is possible to prevent the material from exerting a large pushing force upon an end surface of the screw blade. As a result, the screw does not flex due to the large pushing force, so that, for example, the screw blade does not rub against an inside wall surface of the barrel. Therefore, it is possible to supply and knead a large amount of material without limiting the types of materials for kneading.

If the supply opening member can be divided into parts, when the supply opening member and the supply path member are changed, it is possible to change parameters, such as the arrangement, shape, and size of the supply openings, for properly cutting the supplied material by the screw blade. Therefore, supply openings properly corresponding to the manufacturing conditions and physical properties of the material to be kneaded can be formed in the barrel. In addition to being possible to select supply openings which match the material to be kneaded, it is also possible to easily change the material to be kneaded so that there is no possibility of it being mixed with a different type of material by simply changing the supply opening member without cleaning away/removing the material remaining in the supply holes.

In the kneading apparatus, the connecting mechanism can have the supply opening member separably formed thereat, and has a supply path member which is interposed between the supply opening member and the pusher and which can be divided into a plurality of parts parallel to a direction in which material to be kneaded flows.

According to this structure, even if the gap between the pusher and the barrel is not enlarged, it is possible to mount the supply opening member to and dismount it from the barrel by using the space provided after removing the supply path member because the supply path member can be removed by dividing it into parts.

In the kneading apparatus, a barrel-side end surface of the supply opening member can be within 0.3 mm outward from an inside surface of the barrel.

According to this structure, it is possible to satisfactorily eliminate problems, such as a fixed amount of material not being fed when the material is supplied from the supply openings to the apparatus, and the screw blade rubbing against the barrel, causing, for example, burning of the material due to building up of the material.

The kneading apparatus can further comprise discharge ports provided at a plurality of positions of the barrel, for discharging the kneaded product and a discharge position selecting means for selecting one of the plurality of discharge ports so as to discharge the kneaded product from only a selected discharge port.

According to this construction, a plurality of kneading portions, respectively formed by the barrel and the kneading blades, may be provided in plural steps, and the discharge ports may be respectively provided on the downstream sides of the kneading portions in the extrusion direction of the kneaded product. Furthermore, the discharge position selecting means enables masticated rubber or a kneaded rubber composition to be discharged from the discharge port at a predetermined position in the axial direction of the screw. Namely, even in a continuous kneading apparatus, the number of the steps of kneading portions through which the material to be kneaded is passed can be selected according to the desired viscosity level and the desired dispersion level of a compounding agent. Therefore, in an apparatus for producing a kneaded product of a rubber composition, the viscosity and the dispersion level of a compounding agent can be adjusted and controlled in a wide range. It is also possible to achieve a kneading apparatus which permits continuous kneading, and significant rationalization of a process for producing a kneaded product, i.e., an improvement in productivity, and simplification, power saving and cost reduction of the producing process.

Since the charging port is provided at one end of the barrel, the distance between the rotation-driving portion of the screw set and a maximum-load position can be decreased, thereby suppressing damage to the screw set.

The kneading apparatus can further comprise charging ports provided at a plurality of positions of the barrel, for supplying the material to be kneaded into the chamber and a feeder for supplying the material to be kneaded through a selected one of said plurality of charging ports.

According to this construction, the material to be kneaded is kneaded in a region from the selected charging port to the end. Namely, even in continuous kneading, the length of passage of the material to be kneaded through the chamber can be changed by appropriately selecting one of the charging ports, and an amount of kneading work can be imparted to the material to be kneaded according to a desired viscosity level and a desired dispersion level of the compounding agents, to obtain a desired kneading condition. It is thus possible to provide a kneading method which is capable of adjusting and controlling the viscosity and the dispersion level of the compounding agents over a wide range in producing a kneaded product of a rubber composition, and which permits continuous kneading, and significant rationalization of production of the kneaded product, i.e., an improvement of productivity, and simplification, power saving and cost reduction of the producing process.

BRIEF DESCRIPTION OF THE DRAWINGS

FIG. 6 is a schematic view of a modification of the kneading apparatus of a rubber composition.

DETAILED DESCRIPTION OF THE PREFERRED EMBODIMENTS

Hereunder, a description of the first embodiment of the present invention will be given with reference to the drawings.

Figure 1:
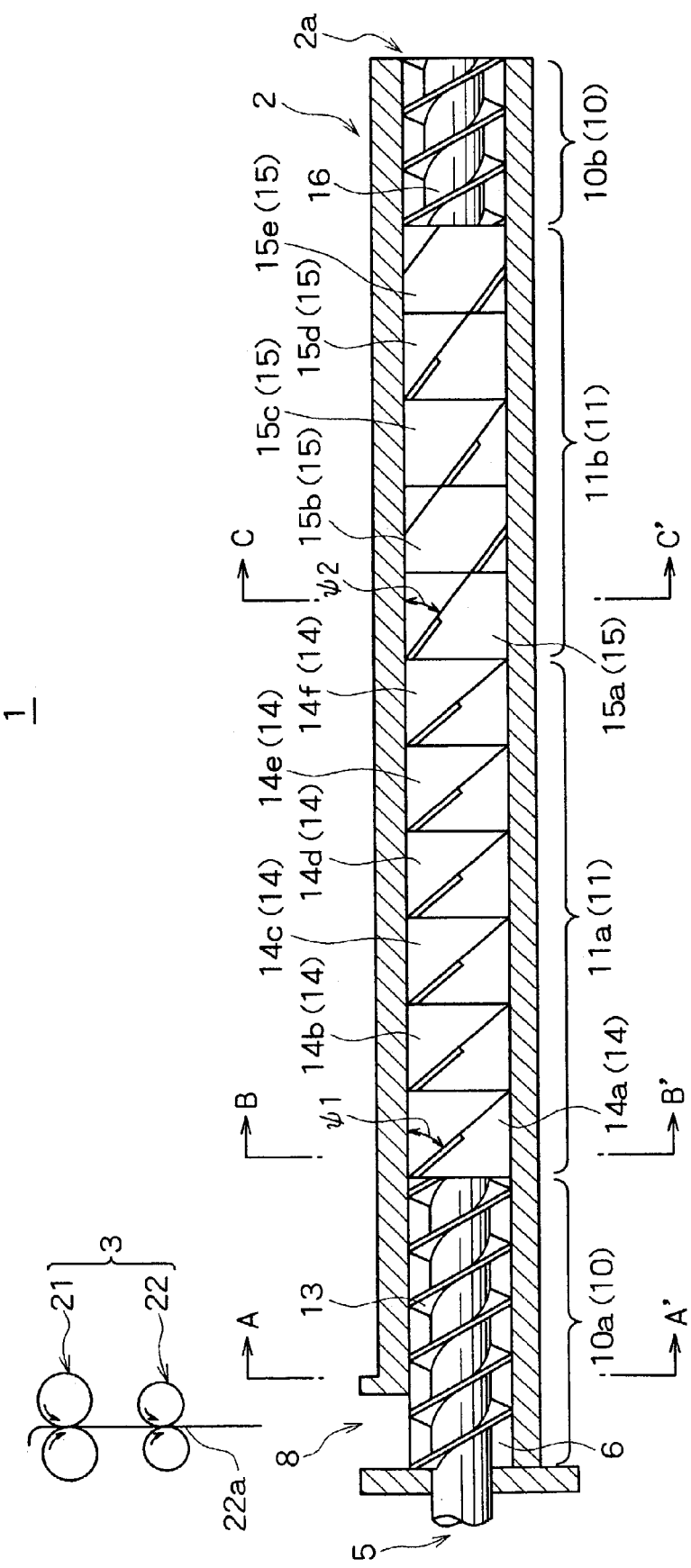
FIG. 1 is a side sectional schematic view of a kneading apparatus of a rubber composition of an embodiment of the present invention.

FIG. 1 is a schematic side sectional view of a kneading apparatus 1 of a rubber composition of an embodiment of the present invention. As shown in the figure, the kneading apparatus 1 comprises a co-directionally rotating engagement type biaxial kneading extruder 2 and a rubber supplier 3 for supplying a material to be kneaded, such as rubber, to the biaxial kneading extruder 2.

The biaxial kneading extruder 2 comprises a pair of screw sets 5 and a barrel 7 having a chamber 6, which is a cylindrical hollow, for allowing rotation of the screw sets 5. In the side view of FIG. 1, the pair of screw sets 5 are disposed so as to overlap each other, with their shaft central portions being parallel to each other. At the outside of the barrel 7, the screw sets 5 are connected to a driver (not shown; disposed on the left of the screw sets 5) and are rotationally driven in the same direction. The chamber 6, which is a cocoon-shaped cross section cylindrical hollow, is provided in the barrel 7. The pair of screw sets 5 are accommodated inside the chamber 6 (see FIG. 2, which is a sectional view along arrows A–A').

A supply opening 8 (hopper) for supplying a material to be kneaded, comprising rubber or rubber containing, for example, a filler or additive such as various compound agents, into the chamber 6 is provided at one end of the barrel 7. By rotation of the screw sets 5 inside the chamber 6, the material supplied from the supply opening 8 by the rubber supplier 3 is extruded in the shaft direction towards the right in the figure and is continuously kneaded.

Figure 2:
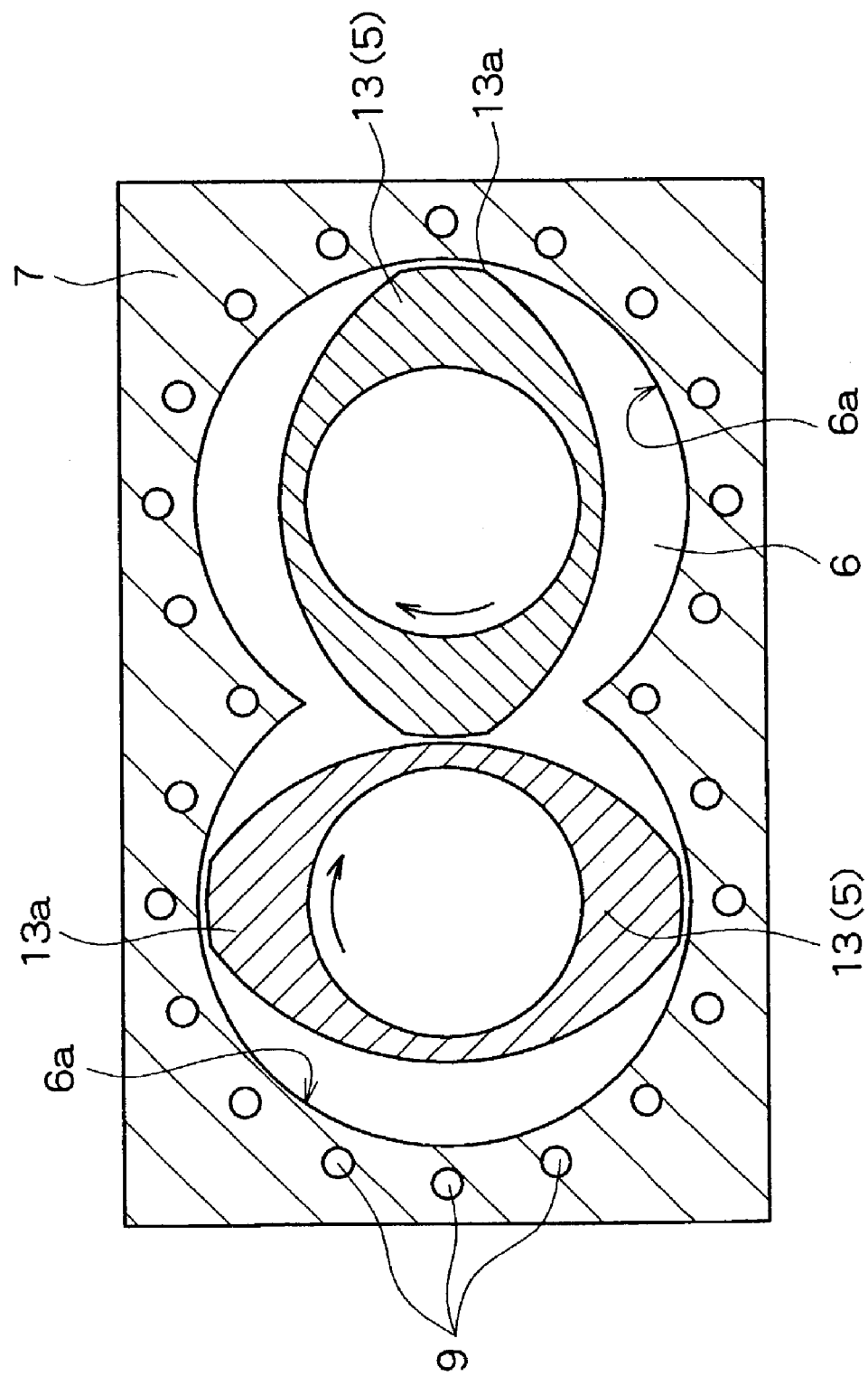
FIG. 2 is a sectional view taken along arrows A–A' of FIG. 1.

As shown in FIG. 2 (sectional view along arrows A–A'), FIG. 3 (sectional view along arrows B–B'), and FIG. 4 (sectional view along arrows C–C'), a plurality of cooling liquid flow paths 9 are formed in the barrel 7 so as to surround the chamber 6 in the shaft direction of the screw sets (hereinafter referred to as simply "shaft direction"). By passing a coolant, such as cooling water, through the cooling liquid flow paths 9, an increase in the temperature of the material being continuously kneaded is restricted through the barrel 7.

The barrel 7 is formed by a combination of a plurality of units (not shown) which can be divided in the shaft direction, with an end 2a of the barrel 7 being open to the air. Although the kneading apparatus 1 shown in FIG. 1 is one which discharges a lump of kneaded material, a die may be connected to the end 2a so that the kneaded material formed with a predetermined sectional shape is discharged.

Each screw set 5 comprises a first screw segment 13 and a second screw segment 16, which are disposed at the upstream side and the downstream side, respectively. Each screw set 5 is formed by mounting a first kneading blade section 14 and a second kneading blade section 15 between the first screw segment 13 and the second screw segment 16 in the shaft direction.

Screw sections 10 (10a, 10b) of each screw set 5 are formed by the barrel 7 and the first screw segment 13 and by the barrel 7 and the second screw segment 16, respectively. Similarly, each first kneading section 11a (11) is formed by the barrel 7 and the first kneading blade section 14, and each second kneading portion 11b (11) is formed by the barrel 7 and the second kneading blade section 15.

The screw segments 13 are formed downstream from directly below the supply opening 8, and, as shown in FIG. 2 (sectional view along arrows A–A'), have two helical blades. By forming a small gap by disposing an end 13a of each helical blade and an inside wall 6a of the chamber 6 close to each other, the material to be kneaded that has been put in such that it can be properly bitten. The two screw segments 13 extrude the material to be kneaded towards the right in FIG. 1 by rotating in the same direction as indicated by the arrows.

Each first kneading blade section 14 and each second kneading blade section 15 comprise a plurality of rotor segments (14a, 14b, etc.) having two helical blades. Each first kneading blade section 14 includes six rotor segments (14a to 14f) having a twist angle $\phi 1$. Each second kneading blade section 15 comprises five rotor segments (15a to 15e) having a twist angle $\phi 2$. In this way, when rotor segments which can shear a material strongly are used in the kneading blade sections, even if high viscosity rubber or rubber composition is used, it is possible to adjust the viscosity and dispersibility of compound agents in order to continuously knead the material.

Here, the twist angle is an angle formed when the shaft direction and a tangential line, extending in the helical direction at a top portion of a helical blade formed so as to extend in the shaft direction along the peripheral direction of a screw set 5, is projected onto a surface parallel to the shaft. The twist angle $\phi 1$ of the rotor segments (14a to 14f) of each first kneading blade section 14 and the twist angle $\phi 2$ of the rotor segments (15a to 15e) of each second kneading blade section 15 are different.

In the kneading apparatus 1 shown in FIG. 1, the twist angle $\phi 2$ is smaller than the twist angle $\phi 1$. Accordingly, when the twist angle $\phi 2$ of the rotor segments mounted at the downstream side is small, discharge of the material at the downstream side can be accelerated. When the twist angle of the rotor segments mounted at the upstream side is large, the upstream side is easily filled with the material to be kneaded, so that the material is kneaded efficiently.

Although, during continuous kneading, the viscosity of the material at the upstream side is high due to a low temperature, it is low at the downstream side as the kneading operation progresses due to an increase in temperature caused by heating. In this case, the twist angle $\phi 1$ of each upstream-side first kneading blade section 14 is made large and the twist angle $\phi 2$ of each downstream-side second kneading blade section 15 is made small in order to make it difficult for an unbalanced load to be produced in accordance with the viscosity during kneading.

It is desirable that the twist angles $\phi 1$ and $\phi 2$ both be equal to or less than 45°. When they are equal to or less than 45°, the degree with which the material to be kneaded is filled at the kneading section 11 increases to a proper level, so that the required shearing force is easily applied.

Figure 5A:
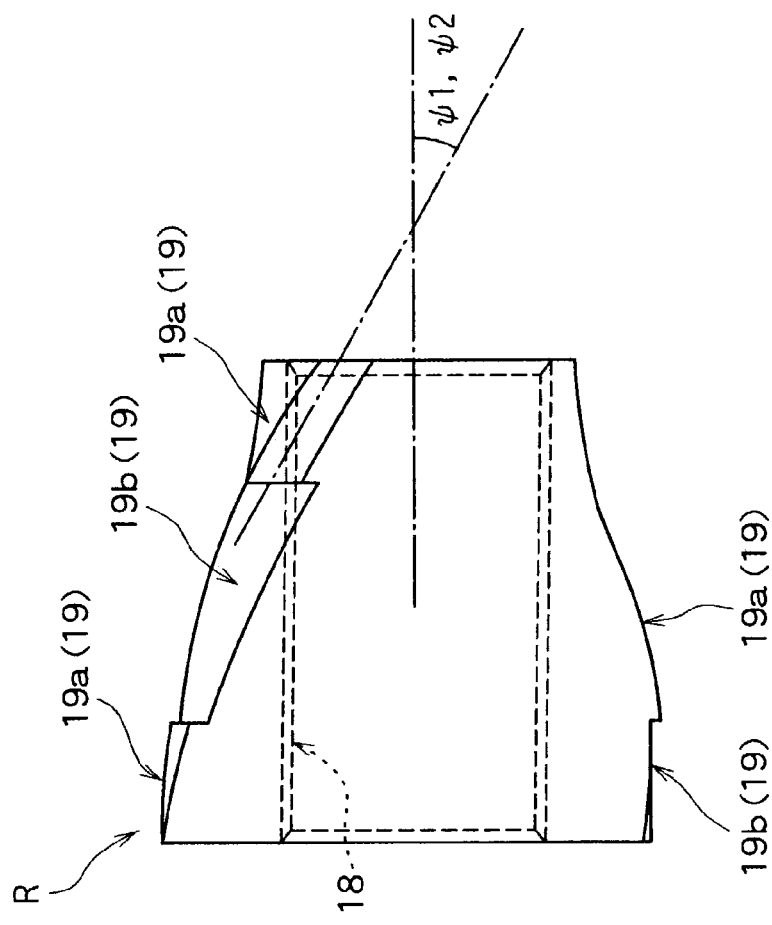
FIG. 5 is a schematic view of one rotor segment of the kneading apparatus of a rubber composition of the embodiment.
Figure 5B:
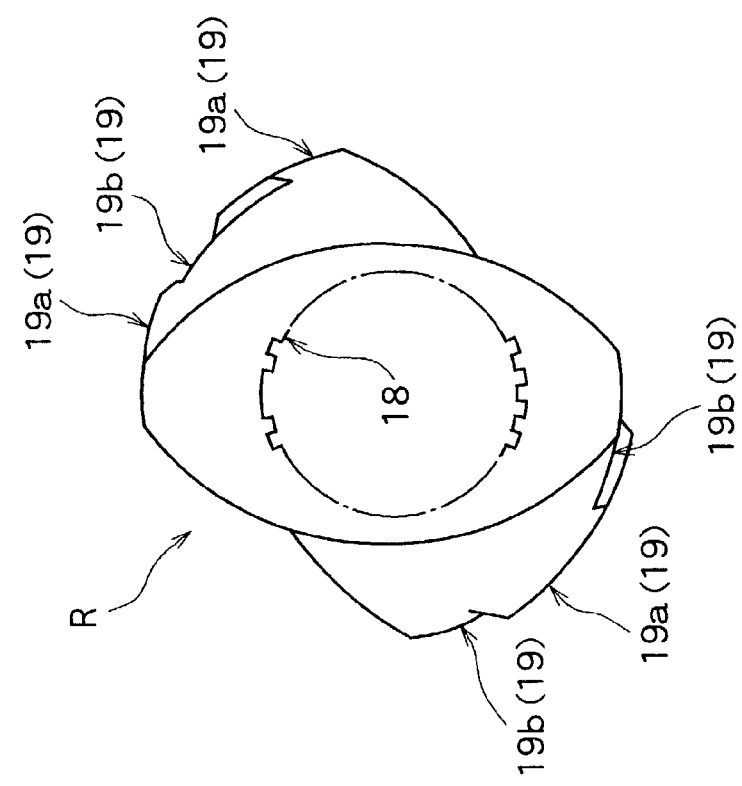

FIG. 5 is a schematic view of one rotor segment (for example, the rotor segment 14a). As shown in the figure, the rotor segment R has a shaft hole 18. By fittingly inserting the shaft of the screw set 5 into the shaft hole 18, it is mounted to the screw set 5. A high tip section 19a and a low tip section 19b are separated in the shaft direction and are formed one after the other on top portions 19 of the two helical blades.

The distance from the shaft center to the top portion of the low tip section 19b is smaller than the distance from the shaft center to the top portion of the high tip section 19a. When the high tip section 19a is formed at the top portion 19 of one helical blade, the low tip section 19 is formed at the top portion 19 of the other helical blade. By this structure, as described later, a wide tip clearance and a narrow tip clearance are formed so as to appear one after the other between the inside wall 6a of the chamber and the rotor segment R.

By combining each of the rotor segments R in the shaft direction, each first kneading blade section 14 and each second kneading blade section 15 are formed as shown in FIG. 1. The rotor segments (14a, 14b, . . . ) are combined in the shaft direction so that the helical blades are continuously and consecutively formed in the helical direction. In particular, the state of one second kneading blade section 15 is well illustrated.

Figure 3:
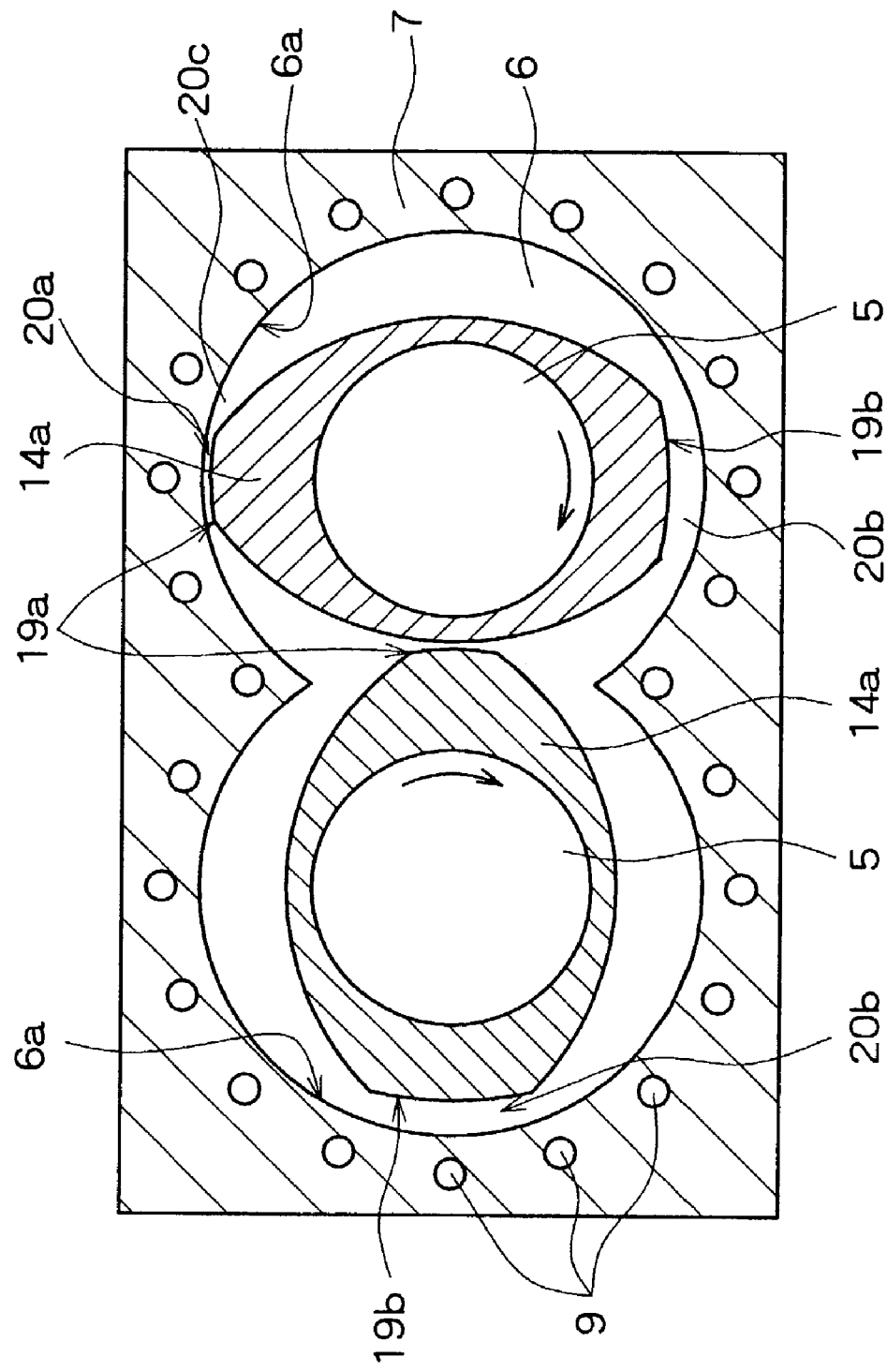
FIG. 3 is a sectional view taken along arrows B–B' of FIG. 1.

FIG. 3 is a sectional view along arrows B–B', in which the rotor segments 14a (as well as the rotor segments 14b to 14f) provided at the respective biaxial screw sets 5 engage and rotate in the same direction as the screw segments 13 (directions of rotation are indicated by the arrows in FIG. 3). Each rotor segment 14a has two helical blades, and, as mentioned above, a high tip section 19a is formed at the top portion of one of the helical blades and a low tip section 19b is formed at the top portion of the other helical blade.

Tip clearances 20a formed between the respective high tip sections 19a and the inside wall 6a of the chamber are formed relatively narrow by disposing the high tip sections 19a and the inside wall 6a of the chamber close together. On the other hand, tip clearances 20b formed between the respective low tip sections 19b and the inside wall 6a of the chamber are relatively wide. In other words, a tip clearance 20a between one of the helical blades and the inside wall 6a of the chamber is narrower than a tip clearance 20b between the other helical blade and the inside wall 6a of the chamber.

By forming the rotor segments in this way, the screw sets 5 are always stably supported inside the chamber 6 through the material to be kneaded at each high tip section 19a side. Therefore, even if the rotor segments are continuously mounted, it is possible to prevent the screw shafts from flexing greatly and the shaft centers from getting shifted during kneading. Consequently, it is possible to prevent partial wearing of and damage to the rotor segments.

By forming the narrow tip clearances 20a between the high tip sections 19a of the corresponding one of the helical blades and the inside wall 6a of the chamber, it is possible to prevent the material to be kneaded from adhering to the inside wall 6a of the chamber. In other words, since this material which adheres to the inside wall 6a of the chamber is scraped off by each high tip section 19a, this material can be separated well. Therefore, it is possible to prevent the material to be kneaded from building up inside the barrel 7.

By forming each high tip section 19a at one of the helical blades and forming each low tip section 19b at the other helical blade, the narrow tip clearances 20a and the wide tip clearances 20b appear one after the other. Therefore, in the narrow tip clearances 20a and wedge-shaped spaces 20c, formed beside the respective narrow tip clearances 20a, a strong shearing force can be applied to the material to be kneaded. In each wide tip clearance 20a, it is possible to accelerate passage of the material to be kneaded. Therefore, it is possible to easily shear this material uniformly, so that this material can be sufficiently kneaded while being transported. According to this structure, since the material is not easily unevenly distributed inside the chamber 6, it is possible to reduce mechanical load exerted upon the screw sets 5.

Figure 4:
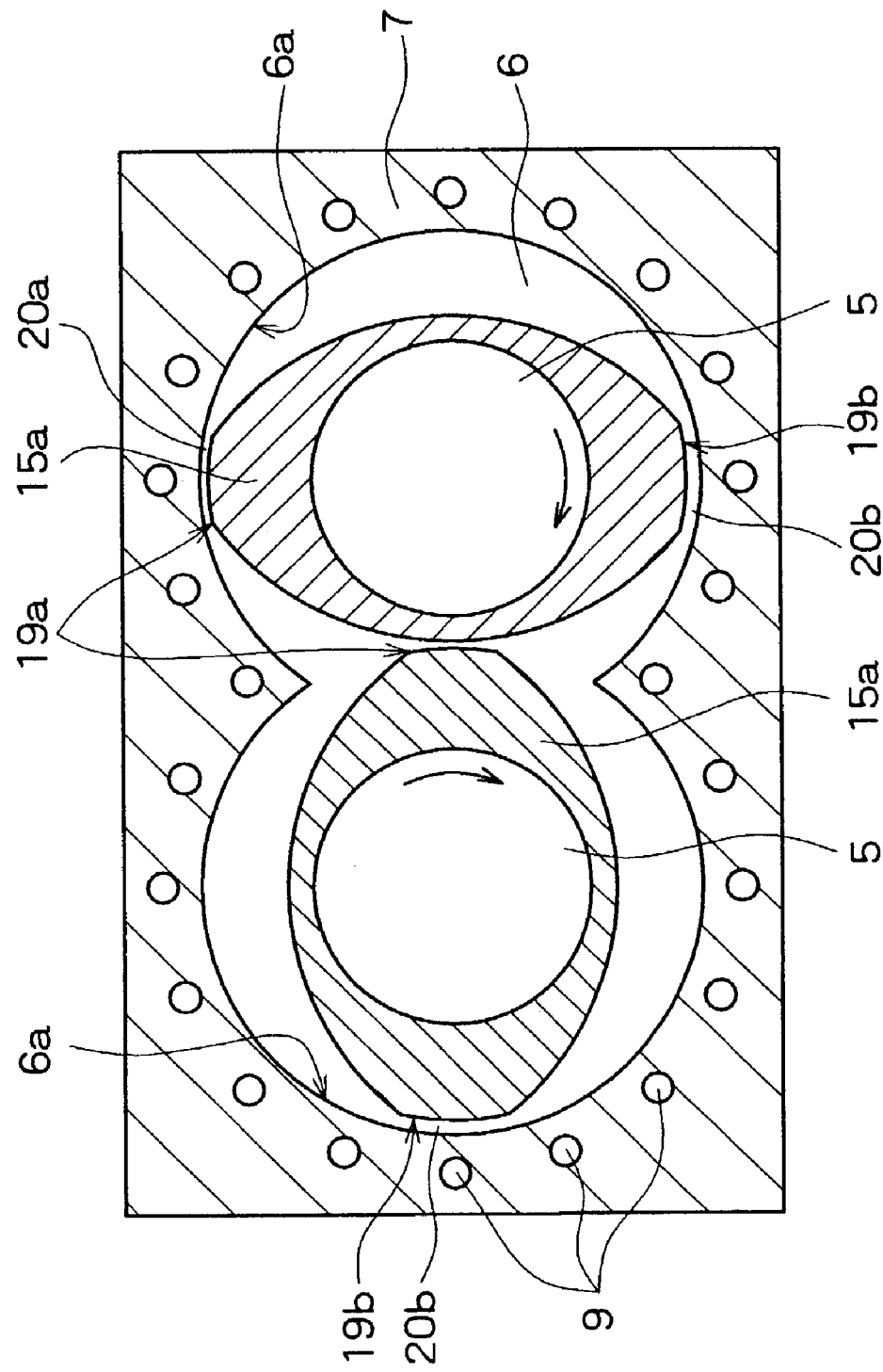
FIG. 4 is a sectional view taken along arrows C–C' of FIG. 1.

FIG. 4 is a sectional view taken along arrows C–C'. Like the rotor segments (14a to 14f) of each first kneading section 11a illustrated in FIG. 3, the rotor segment 15a (as well as the rotor segments 15b to 15e) has a high tip section 19a and a low tip section 19b. Narrow tip clearances 20a are formed between the respective high tip sections 19a and the inside wall 6a of the chamber, and wide tip clearances 20b are formed between the respective low tip sections 19b and the inside wall 6a of the chamber. The actions provided by these tip clearances 20a and 20b are qualitatively the same as those provided by the tip clearances 20a and 20b of each first kneading section 11a. However, in each second kneading section 11b, the wide tip clearance 20b is narrower than the wide tip clearance 20b of each first kneading section 11a.

In other words, the wide tip clearance 20b of each downstream-side second kneading section 11b is narrower than the wide tip clearance 20b of each upstream-side first kneading section 11a, the upstream and downstream sides being defined in terms of the direction in which the material to be kneaded is extruded. As mentioned above, although, during kneading, the viscosity of the material at the upstream side is high due to a low temperature, it is low at the downstream side as the kneading operation progresses due to an increase in temperature caused by heating during the kneading operation. In this case, if it is possible to set the tip clearances in accordance with changes in the viscosity of the material being kneaded, the proper shearing force can be exerted. Therefore, as in the kneading apparatus 1, by forming the tip clearances 20b so that they become narrower towards the downstream side from the upstream side in the extrusion direction, it is possible to provide proper tip clearances in accordance with changes in the state of the material being continuously kneaded, so that high kneading efficiency can be achieved.

The screw segments 16 are mounted at the portions of the screw sets 5 at the downstream side of the respective second kneading sections 11b. The material that has been kneaded by the kneading sections 11 is discharged from the end 2a of the screw sections 10b by rotation of the screw segments 16.

The biaxial kneading extruder 2 is formed as described above. The material to be kneaded supplied from the supply opening 8 is kneaded inside the biaxial kneading extruder 2. Then, the viscosity and the dispersibility are adjusted to desired values, after which the material is discharged. As described above, rubber is supplied to the supply opening 8, disposed in one end of the biaxial kneading extruder 2, by the rubber supplier 3, disposed above the supply opening 8.

The rubber supplier 3 quantitatively supplies a sheet-shaped material to be kneaded, and comprises a feeder roll assembly 21 and a cutter roll assembly 22.

The feeder roll assembly 21 comprises a pair of rolls which rotate in opposite directions and which nip the sheet-shaped material for transporting it. By a driver (not shown), the feeder roll assembly 21 is rotationally drive at variable speed, so that the rubber sheet supplying speed (amount of supply per unit time) can be adjusted.

The cutter roll assembly 22 is disposed below the feeder roll assembly 21, and comprises a pair of rolls which nip the rubber sheet and rotate in opposite directions. A cutter blade 22a is formed at a predetermined location of the outer periphery of the cutter roll assembly 22. The cutter blade 22a previously forms a cut in the rubber sheet with every rotation of the cutter roll assembly 22, so that, even if the rubber sheet is pulled in by each screw segment 13 of the biaxial kneading extruder 2, the material is cut at the previously formed cut in order to quantitatively supply the material to be kneaded to the biaxial kneading extruder 2.

The structure of the kneading apparatus 1 of the first embodiment has been described above. Next, the operation of the kneading apparatus 1 will be described with reference to FIG. 1. First, the sheet-shaped material to be kneaded, including a filler such as carbon black or additive such as various compound agents, is supplied into the chamber 6 of the biaxial kneading extruder 2 from the supply opening 8. The sheet-shaped material is quantitatively supplied into the chamber 6 by the feeder roll assembly 21 and the cutter roll assembly 22.

At this time, in the chamber 6, the pair of screw sets 5 engage and rotate in the same direction by a driver (not shown) (see FIGS. 2 to 4). The material supplied into the chamber 6 is extruded to each first kneading section 11a by the two helical blades of each screw segment 13.

In each first kneading section 11a, the extruded material fills the space between each first kneading blade section 14 and the inside wall 6a of the chamber so as to built up there. While filling this space, in the tip clearances (20a, 20b), the material flows and is subjected to a shearing force in order to be kneaded so as to be mixed and dispersed.

At this time, as mentioned above, in the narrow, wedge-shaped spaces and the narrow tip clearances 20a, formed between the respective high tip sections 19a and the inside wall 6a of the chamber, a high shearing force is exerted upon the material, so that a reduction in viscosity is accelerated. In addition, in the wide tip clearances 20b between the respective low tip sections 19b and the inside wall 6a of the chamber, uniform shearing is accelerated by the passage of the material through a high-shearing area.

The material kneaded at each first kneading section 11a is extruded to each second kneading section 11b unchanged. Here, the viscosity of the material that has reached the second kneading sections 11b is reduced due to, for example, heating, as mentioned above. However, since the wide tip clearances 20b of the second kneading sections 11b are formed narrower than the wide tip clearances 20b of the first kneading sections 11a, it is possible to exert a sufficient shearing force upon the material. Therefore, the biaxial kneading extruder 2 provides high kneading efficiency.

Lastly, the material kneaded at the second kneading sections 11b is extruded from the screw sections 10b and is discharged from the end 2a. The description of the kneading apparatus 1 of the first embodiment has been completed.

Next, a description of a kneading apparatus 50 of a rubber composition of a modified embodiment of the first embodiment will be given. FIG. 6 is a schematic view of the kneading apparatus 50. The kneading apparatus 50 comprises a biaxial kneading extruder 51 and a rubber supplier 52. FIG. 6 separately illustrates a barrel 53 and screw sets 54 of the biaxial kneading extruder 51. As in the embodiment in FIG. 1, a pair of the screw sets 54 are provided as codirectionally rotating engagement type screw sets. A supply opening 53a is provided in the barrel 53.

The kneading apparatus 50 is substantially the same as the kneading apparatus 1 of the embodiment in FIG. 1, except that a screw segment 57 is mounted between a first kneading blade section 56 and a second kneading blade section 58 of each screw set 54. In other words, in each screw set 54, a first screw segment 55, the first kneading blade section 56, a second screw segment 57, the second kneading blade section 58, and a third screw segment 59 are mounted in that order.

An opening 53b is provided in a portion of the barrel 53 situated in correspondence with the location of each second screw segment 57, and the state of the inside of the barrel 53 can be observed through the opening 53b. Accordingly, the state of the material immediately after it has been kneaded at the first kneading sections 60, formed by the respective first kneading blade sections 56 and portions of the barrel situated in correspondence with the locations of the respective first kneading blade sections 56, can be observed and the material can be sampled, so that the kneaded state of the material can be determined. Therefore, in accordance with the results of the determination, segments to be mounted in each second kneading blade section can be formed with the proper structures.

As in the embodiment in FIG. 1, the first kneading blade sections 56 and the second kneading blade sections 58 each comprise a plurality of two-blade rotor segments. The twist angles and forms of tip clearances, formed between the first kneading blade sections 56 and the inside wall of a chamber (not shown) and the second kneading blade sections 58 and the inside wall of the chamber, are the same as those of the embodiment in FIG. 1, but the number of segments that are disposed is different.

In FIG. 6, when the material to be kneaded is desired to be supplied from the opening 53b, the rubber supplier 52 may be moved in the axial direction and disposed above the opening 53.

As shown in FIG. 6, the kneading apparatus 50 comprises a plurality of openings 53 (53a and 53b), and one of the openings 53 can be selected for supplying the material to be kneaded. Therefore, the material to be kneaded is kneaded in a region from the selected opening to the end of the kneading apparatus 50. Namely, even in continuous kneading, the length of passage of the material to be kneaded through the chamber of the barrel 53 can be changed by appropriately selecting the opening 53, and thus an amount of kneading work corresponding to a desired viscosity level and a desired dispersion level of the compounding agents can be imparted to the material to be kneaded, to achieve a desired kneading condition. Therefore, in producing a rubber composition, the viscosity and the dispersion level of the compounding agents can be adjusted or controlled over a wide range.

Figure 7:
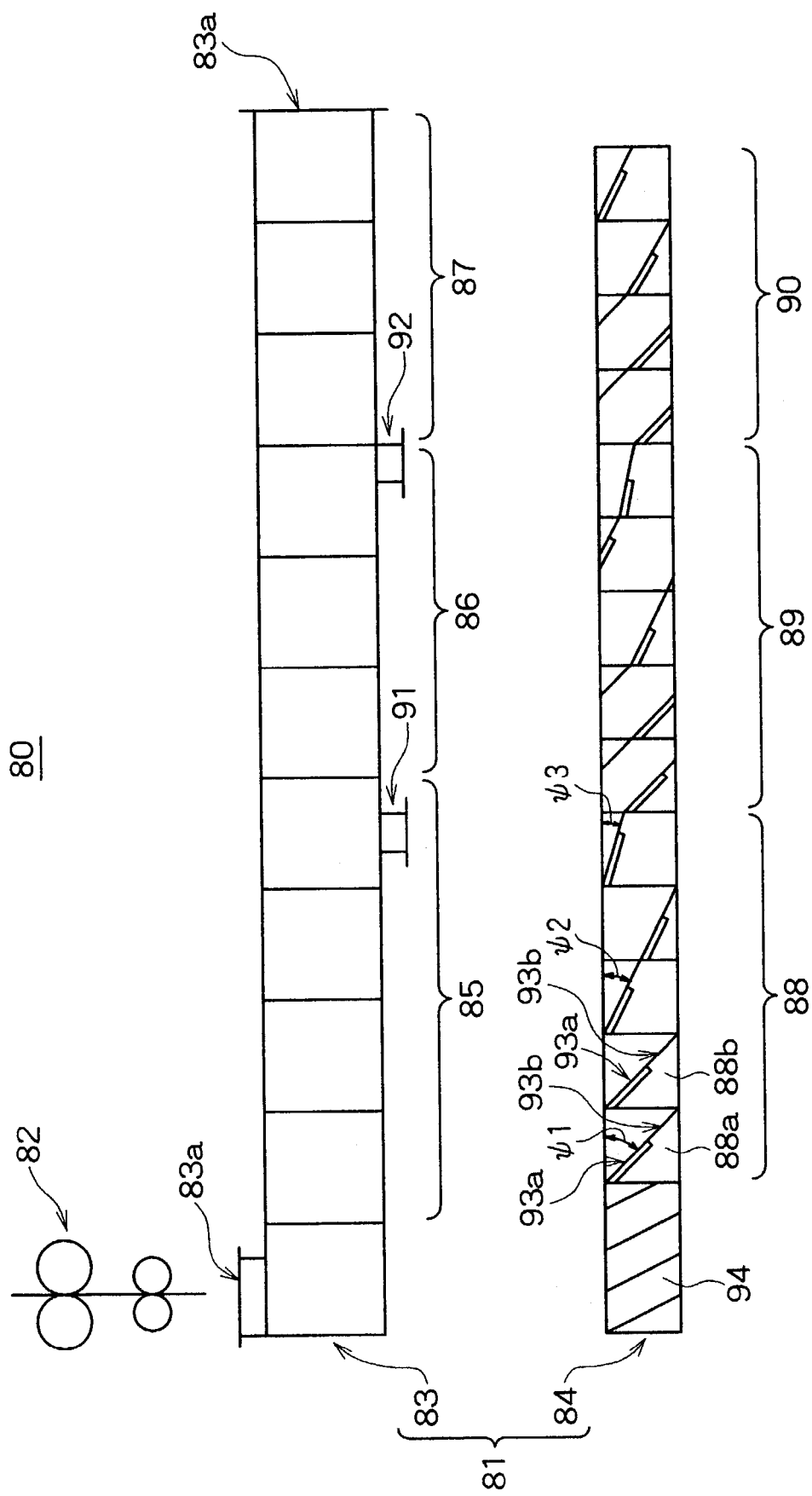
FIG. 7 is a schematic view of another modification of the kneading apparatus of a rubber composition.

Next, a description of a kneading apparatus 80 of a rubber composition of another modified embodiment of the first embodiment will be given. FIG. 7 is a schematic view of the kneading apparatus 80. The kneading apparatus 80 comprises a biaxial kneading extruder 81 and a rubber supplier 82. FIG. 6 separately illustrates a barrel 83 and screw sets 84 of the biaxial kneading extruder 81. As in the embodiment in FIG. 1, a pair of the screw sets 84 are provided as codirectionally rotating engagement type screw sets. A supply opening 83a is provided in the barrel 83.

Unlike the biaxial kneading extruder 2 used in the embodiment in FIG. 1, the biaxial kneading extruder 81 includes three zones of first to third kneading sections (85, 86, 87), and first to third kneading blade sections (88, 89, 90) of the screw sets 84 are formed in correspondence with these zones. These kneading blade sections (88 to 90) comprise a plurality of mounted two-blade rotor segments. Openings 91 and 92 for discharging a kneaded material are provided at the downstream-side terminal ends of the first kneading sections 85 and the second kneading sections 86, respectively. A screw segment 94 is provided at only the upstream-side of the screw sets 84.

When the discharge openings (91, 92) of the barrel 83 are not used to discharge material, they are closed by closing members (not shown). When the discharge openings are used to discharge material, only the closing member of the discharge opening used to discharge material is removed in order to discharge the kneaded material therefrom. When both of the discharge openings are closed by their closing member, the kneaded material is discharged from the end 83a, disposed downstream in the direction of extrusion from the barrel 83.

By virtue of this structure, in accordance with the type of material to be kneaded or in accordance with the desired level of adjustment in the amount of reduction in the viscosity and in the dispersibility of various mixed compound agents, it is possible to select the location where the kneaded material is discharged. In other words, when a low-viscosity material is to be kneaded or when the desired adjustment in the dispersibility of compound agents or in the amount of reduction in the viscosity is small, selection of the discharge opening 91 is recommended. In this case, since the material is kneaded only at the first kneading sections 85, the kneading section lengths are short, and a material in the desired kneaded state can be obtained. On the other hand, when a high-viscosity material is to be kneaded or when the desired adjustment in the dispersibility of compound agents or in the amount of reduction in the viscosity is large, the kneaded material is discharged from the discharge opening 92 or the end 83a. In this case, the material is kneaded at the first and second kneading sections or the first to third kneading sections, so that the kneading section lengths become long, and a material in the desired kneaded state can be obtained.

By providing a plurality of discharge openings in the barrel 83 downstream in the direction of extrusion as described above, a larger variety of materials can be continuously kneaded, and the dispersibility of compound agents and the viscosity can be adjusted over a wide range. In addition, by this, since the viscosity can be easily adjusted over a wide range by only mounting and dismounting the closing members, the task of rearranging the various segments of the screw sets, which takes considerable time and trouble, can be eliminated.

As mentioned above, each of the kneading blade sections (88 to 90) comprises a plurality of two-blade rotor segments (88a, 88b, etc.). As in the first embodiment shown in, for example, FIG. 5, each rotor segment of each of the kneading blade sections (88 to 90) has a high tip section 93a and a low tip section 93b. In addition, as in the embodiment in FIG. 1, narrow tip clearances (not shown) are formed between the respective high tip sections 93a and the inside wall (not shown) of the chamber inside the barrel 83, and wide tip clearances (not shown) are formed between the respective low tip sections 93b and the inside wall of the chamber.

The biaxial kneading extruder 81 is formed so that the wide tip clearances and the narrow tip clearances appear one after the other. With each of the kneading sections (85 to 87), the rotor segments are mounted so that the wide tip clearances become narrower from the upstream side to the downstream side. Each wide tip clearance at each kneading section is formed so as to become narrower from the upstream side to the downstream side. In other words, in each kneading section, each wide tip clearance is formed so as to become narrower towards the downstream side. In addition, even when the kneading sections are compared, the wide tip clearances are formed so that those of the kneading sections disposed downstream are narrower. By this structure, as in the embodiment in FIG. 1, proper kneading conditions can be set in accordance with changes in the viscosity of the material being continuously kneaded.

The twist angle of each rotor segment is set so that, in each kneading section, upstream twist angles are large and downstream twist angles are small. More specifically, for example, twist angles ($\phi 1$ to $\phi 3$) in each first kneading blade section 88 are in the relationship ($\phi 1 > \phi 2 > \phi 3$). By such a structure, at the upstream side of each kneading section, the degree with which the material to be kneaded fills the chamber upstream side, so that a high shearing force is applied. At each downstream side, discharge of the material is accelerated, so that the material is quickly extruded. The rotor segments disposed in correspondence with the locations of the discharge openings (91, 92) have small twist angles, so that discharge of the kneaded material from the discharge openings (91, 92) tends to be accelerated.

The kneading apparatuses of the first embodiment have been described. The present invention is not limited to the above-described embodiments, so that, for example, the following modifications may be made.

(1) Although, in the above-described embodiments, the rotor segments have two helical blades in the kneading blade sections, rotor segments having three helical blades may also be similarly used in the present invention.

(2) Combinations of twist angles and tip clearances are not limited to those of the embodiments, so that various other combinations are possible. For example, by variously combining the twist angles and tip clearances in accordance with the types of materials to be kneaded, the desired adjustment in the amount of reduction in viscosity, or the adjusted dispersibility of compound agents, it is possible to make adjustments within a wide range of viscosities.

(3) The kneading sections do not have to be divided into a plurality of zones as in the embodiments. In other words, one long continuously formed kneading section may be used. According to the kneading apparatus of the present invention, even if one kneading section is used, a material can be sufficiently kneaded while it is being fed, so that the overall length of the screw sets can be effectively used.

(4) In the first to third embodiments, each of the kneading sections is continuously mounted. In the second embodiment, screw segments are disposed between the respective first and second kneading sections. The present invention is not limited to such examples, so that the screw segments may be disposed at various other locations. In addition, needle discs may be combined in addition to rotor segments.

(5) In each of the above-described embodiments, the rubber supplier comprises a feeder roll assembly having feeder rolls disposed in one row, but the type of the rubber supplier is not limited thereto, so that a rubber supplier comprising a feeder roll assembly having feeder rolls disposed in a plurality of rows may also be used. The rubber supplier is not limited to one supplying a material to be kneaded by a feeder roll assembly, so that it may be, for example, a screw type (such as a uniaxial extrusion screw or a biaxial taper screw feeder type) or a gear pump type. The form of the material to be kneaded and supplied is not limited to the form of a sheet, so that it may have any other forms, such as the form of a ribbon, a lump, or powder, as long as these forms allow the material to be kneaded to be continuously supplied.

Figure 8:
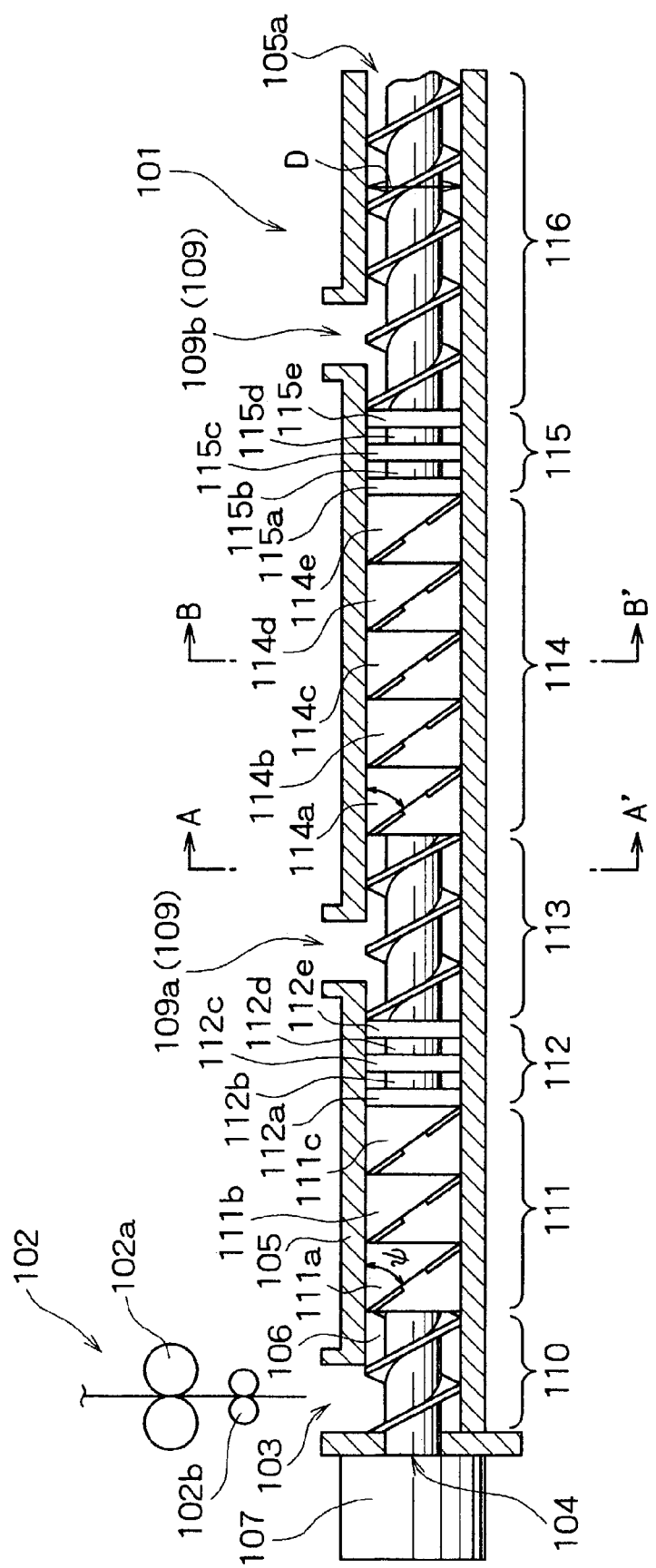
FIG. 8 is a side sectional schematic view of a kneading apparatus of a rubber composition of an embodiment of the present invention.

Hereunder, a description of the second embodiment of the present invention will be given with reference to the drawings. FIG. 8 is a schematic side sectional view of a kneading apparatus 101 of a rubber composition of the embodiment of the present invention. As shown in the figure, the kneading apparatus 101 is formed as a co-directionally rotating engagement type biaxial kneading extruder 102.

The kneading apparatus 101, serving as a biaxial kneading extruder, comprises a pair of screw sets 104 and a barrel 105 having a chamber 106, which is a cylindrical hollow, for allowing rotation of the screw sets 104. In the side view of FIG. 8, the two of screw sets 104 are disposed so as to overlap each other, with their shaft centers being parallel to each other. The pair of screw sets 104 are connected to a driver 107 (shown at the left side in FIG. 8), which is provided at one side of the barrel 105 and which includes a motor and a speed reducer (neither of them are not shown), and are rotationally driven in the same direction. The chamber 106 is a cocoon-shaped cross section cylindrical hollow and accommodates the pair of screw sets 104. The cross section is the same as shown in FIG. 2 in the first embodiment.

A supply opening 103 (hopper) for supplying a material to be kneaded, comprising rubber or rubber containing a filler or an additive such as various compound agents, into the chamber 106 is provided at one end of the barrel 105. The material is supplied into the supply opening 103 from, for example, a rubber supplier 102. FIG. 8 shows the rubber supplier 102 comprising a feeder roll assembly 102a and a chuck roll assembly 2b for sending out sheet-shaped raw-material rubber (material to be kneaded). The material supplied from the supply opening 103 by, for example, the rubber supplier 102 is, by rotation of the screw sets 104 inside the chamber 106, transported in the shaft direction from the illustrated right side (upstream side) to the illustrated left side (downstream side) and continuously kneaded.

A plurality of cooling flow paths 108 are formed in the barrel 105 so as to surround the chamber 106 in the shaft direction of the screw sets 104 (hereinafter referred to as simply "the shaft direction"), in the same way as the first embodiment. By passing a coolant, such as cooling water, through the cooling liquid flow paths 108, an increase in the temperature of the material being continuously kneaded is restricted through the barrel 105.

The barrel 5 has a plurality of openings 109 (109a, 109b) for, for example, exhaustion or observation. It is possible to, through the openings 109, exhaust gas generated during kneading or observe the kneading state of the material being kneaded. Although, in FIG. 8, the openings 109a and 109b both open to the outside, they may have, for example, covers (not shown) mounted thereto.

The barrel 105 is formed by a combination of a plurality of units which can be divided in the shaft direction (division lines not shown), with an end 5a of the barrel 105 being open to the air. Although the kneading apparatus 101 shown in FIG. 8 is one which discharges a lump of kneaded material, a die may be formed connected to the end 105a so that the kneaded material formed with a predetermined sectional shape is discharged.

As shown in FIG. 8, each screw set 104 comprises the following segments members disposed in the following order in the shaft direction, a first screw section 110, a first kneading blade section 111, a first kneading disc section 112, a second screw section 113, a second kneading blade section 114, a second kneading disc section 115, and a third screw section 116.

The first to third screw sections (110, 113, 116) are screw segments incorporated in each screw set 104, and have two helical blades. By forming a small gap by disposing an end of each helical blade and an inside wall 106a of the chamber 106 close to each other, the material is properly bitten, so that the material can be extruded without escaping towards the downstream side. Rotation of the two screw sets 104 in the same direction causes the material to be extruded towards the right in FIG. 8. By the way, the supply opening 103 is provided directly above each first screw section 110 and the openings 109a and 109b are provided directly above each second screw section 113 and each third screw section 116, respectively.

Next, each kneading blade section will be described. One first kneading blade section 111 and one second kneading blade section 114 are incorporated in each screw set 104 so that they are disposed right beside the first screw section 110 and the second screw section 113 at the downstream side. Segment members forming these kneading blade sections are kneading rotor segments (hereinafter referred to as "kneading rotors") which are combined in the shaft direction, with each kneading rotor segment having a twist angle in the direction in which the material is extruded downstream. More specifically, each first kneading blade section 111 has three combined kneading rotors and each second kneading blade section 114 has five combined kneading rotors. The most-upstream-side joining surfaces of the first and second kneading blade sections 111 and 114 and the most-downstream-side joining surfaces of the first and second screw sections 110 and 113 have substantially the same forms and are joined so that they are superimposed upon each other (so that they have the same phases). By this, it is possible to prevent the material from building up in gaps between the screw sections and the respective kneading blade sections and to prevent interference between the screw sections and the respective kneading blade sections.

The kneading rotors (111a to 111c, 114a to 114e) incorporated in the kneading blade sections 111 and 114 each have two helical blades having a certain twist angle φ. The use of kneading rotors having two blades makes it possible to exert a strong shearing force upon the material, so that, even if the material is high-viscosity rubber or rubber composition, it is possible to adjust, for example, the viscosity and dispersibility of compound agents and continuously knead the material.

Here, the twist angle is an angle formed when the shaft direction and a tangential line, extending in the helical direction at a top portion of a helical blade formed so as to extend in the shaft direction along the peripheral direction of a screw set 104, is projected onto a surface parallel to the shaft. In FIG. 8, the first kneading blade sections 111 and the respective second kneading blade sections 114 have the same twist angles φ. However, they may be different. By setting the twist angle of each downstream-side second kneading blade section 114 smaller than the twist angle of each upstream-side first kneading blade section 111, discharge of the material at the downstream side can be accelerated, and the upstream side is easily filled with the material, so that kneading efficiency is increased. It is important that the twist angles are not formed in the direction in which the material is pushed back upstream.

As described in the first embodiment, a high tip section 119a and a low tip section 119b are provided on the top portion 119 of the helical blade.

By combining each of the rotor segments R in the shaft direction, the segment members of each first kneading blade section 111 and each second kneading blade section 114 are formed as shown in FIG. 8. The rotor segments (111a, 111b, . . . ) are combined in the shaft direction so that the helical blades are continuously and consecutively formed in the helical direction.

The first kneading blade sections 111 and the second kneading blade sections 114 include helical blades having lengths that are equal to or greater than outside diameters D of the screw sets (indicated by double-headed arrow at the left side of FIG. 8). The first kneading blade sections 111 and the second kneading blade sections 114 are formed so as to include screw leads having lengths that are equal to or greater than five times the outside diameters D of the screw sets (that is, equal to or greater than 5D).

The kneading rotors 114c (as well as the other kneading rotors) of the biaxial screw sets 104 engage and rotate in the same direction. Each rotor segment 114c has two helical blades, and a high tip section 119a is formed at the top portion of one helical blade and a low tip section 119b is formed at the top portion of the other helical blade.

Tip clearances 120a formed between the respective high tip sections 119a and the inside wall 106a of the chamber are relatively narrow by forming the high tip sections 119a and the inside wall 106a of the chamber close together. (The tip clearances 120a are hereinafter referred to as "the narrow tip clearances 120a.) On the other hand, tip clearances 120b formed between the respective low tip sections 119b and the inside wall 106a of the chamber are relatively wide. (The tip clearances 120b are hereinafter referred to as "the wide tip clearances 120b.)

The first kneading blade sections 111 and the second kneading blade sections 114 are partly cut away as mentioned above. Accordingly, since the material easily passes through each wide tip clearance 120b, passage of some of the material towards the surface of one blade is facilitated, and kneading of the material at each narrow tip clearance 120a while it is being sent downstream is accelerated. Therefore, it is possible to prevent the material from becoming unevenly distributed and building up inside the chamber 106, so that the screw sets 104 can be equally held inside the chamber 106. Consequently, it is possible to restrict, for example, wearing caused by contact of the barrel 105 and the screw sets 104, so that it is possible to prevent a reduction in facility life, and to sufficiently knead the material.

Since cutaway portions are provided, the flowing state of the material inside the chamber 106 can be made complicated, and distribution mixing and dispersive mixing of compound agents can be efficiently carried out. In addition, since the lengths of the helical blades are equal to or greater than the outside diameters D of the screw sets, it is possible to assuredly prevent uneven distribution of the material and efficiently mix compound agents.

Since the lengths of the screw leads of the kneading blade sections are equal to or greater than five times the outside diameters D of the screw sets, the material fills the inside of the chamber 106, so that a sufficiently long material filled portion for stably holding the screw sets 104 can be provided.

The wide tip clearance 120b of the second kneading blade sections 114 (the downstream-side kneading section) can be narrower than the wide tip clearance 120b of the first kneading blade section 111 (upstream-side kneading section), as provided in the first embodiment.

Lastly, the first kneading disc sections 112 and the second kneading disc sections 115, which are the remaining segment members of the screw sets 104 shown in FIG. 8, will be described. One first kneading disc section 112 and one second kneading disc section 115 are incorporated in each screw set 104 so that they are disposed right beside the first kneading blade section 111 and the second kneading blade section 114 at the downstream side, respectively. Segment members forming these kneading disc sections comprise kneading disc blades (hereinafter simply referred to as "kneading discs"), which are combined in the shaft direction. In other words, the first kneading disc sections 112 and the second kneading disc sections 115 comprise a combination of five kneading discs.

The kneading discs (112a to 112e, 115a to 115e) have cross sectional forms which are substantially the same as the cross sectional forms of the kneading rotors and the screw segments(the same cross sectional forms as shown in FIGS. 2 and 3), and are formed as segments having two blades whose top portions are parallel to the shafts and being short in the shaft direction.

The most-downstream-side joining surfaces of the first and second kneading blade sections (111, 114) and the most-upstream-side joining surfaces of the first and second kneading disc sections (112, 115), and the most-upstream-side joining surfaces of the second and third screw sections (113, 116) and the most-downstream-side joining surfaces of the first and second kneading disc sections (112, 115) have substantially the same shapes and are joined so as to be superimposed upon each other (so as to have the same phases). By this, it is possible to prevent the material from building up in gaps between the kneading blade sections and the respective screw sections and between the kneading disc sections and the respective screw sections, and to prevent interference between the kneading blade sections and the respective screw sections and the kneading disc sections and the respective screw sections.

In the first and second kneading disc sections (112, 115), the kneading discs (112a to 112 e, 115a to 115e) are combined in the shaft direction by alternately shifting their axial cross sectional forms by 90° from their respective shaft centers. Here, as mentioned above, the most-upstream-side segments (112a, 115a) of the first and second kneading disc sections (112, 115) are combined with the first and second kneading blade sections (111, 114), respectively, so that their axial cross sectional forms change continuously with those of the first and second kneading blade sections 111 and 114. However, by combining the segments (112b, 115b) whose axial cross sectional forms are displaced downstream by 90°, the first and second kneading disc sections (112, 115) have portions whose axial cross sectional forms change discontinuously. In other words, at the downstream side, the first and second kneading blade sections (111, 114) are adjacent to the other segment members having portions whose axial cross sectional forms change discontinuously.

As mentioned above, the segments (112a to 112e, 115a to 115e) of the first and second kneading disc sections (112, 115) are combined with the phases shifted by 90°. When, instead of providing a phase difference of 90°, phase differences are gradually provided so that the material is transported in the material feeding direction by rotation of the screw sets 104, the material is transported downstream without sufficiently filling the upstream side. In that case, the material is not sufficiently kneaded. When phase differences are gradually provided so that the material is transported in the material returning direction by rotation of the screw sets 104, the material excessively fills the upstream side, so that problems such as the material remaining until the end without being discharged and the temperature becoming too high result. However, when the phase difference is 90°, the first and second kneading disc sections (112, 115) themselves act only to resist the transportation of the material, so that they do not cause the material to be fed or to be returned. Therefore, it is possible to reliably fill the chamber with the material so that only a required amount of it is stopped.

By changing the lengths of the first and second kneading disc sections (112, 115) in the shaft direction or by changing the number of segments to be incorporated, it is possible to suitably adjust the amount of material which is filled at the upstream-side first and second kneading blade sections (111, 114). In that case, it is desirable that the lengths of the first and second kneading disc sections (112, 115) in the shaft direction be equal to or greater than ½ of the outside diameters D of the screw sets. By this, it is possible to stably stop a required amount of material.

Figure 9:
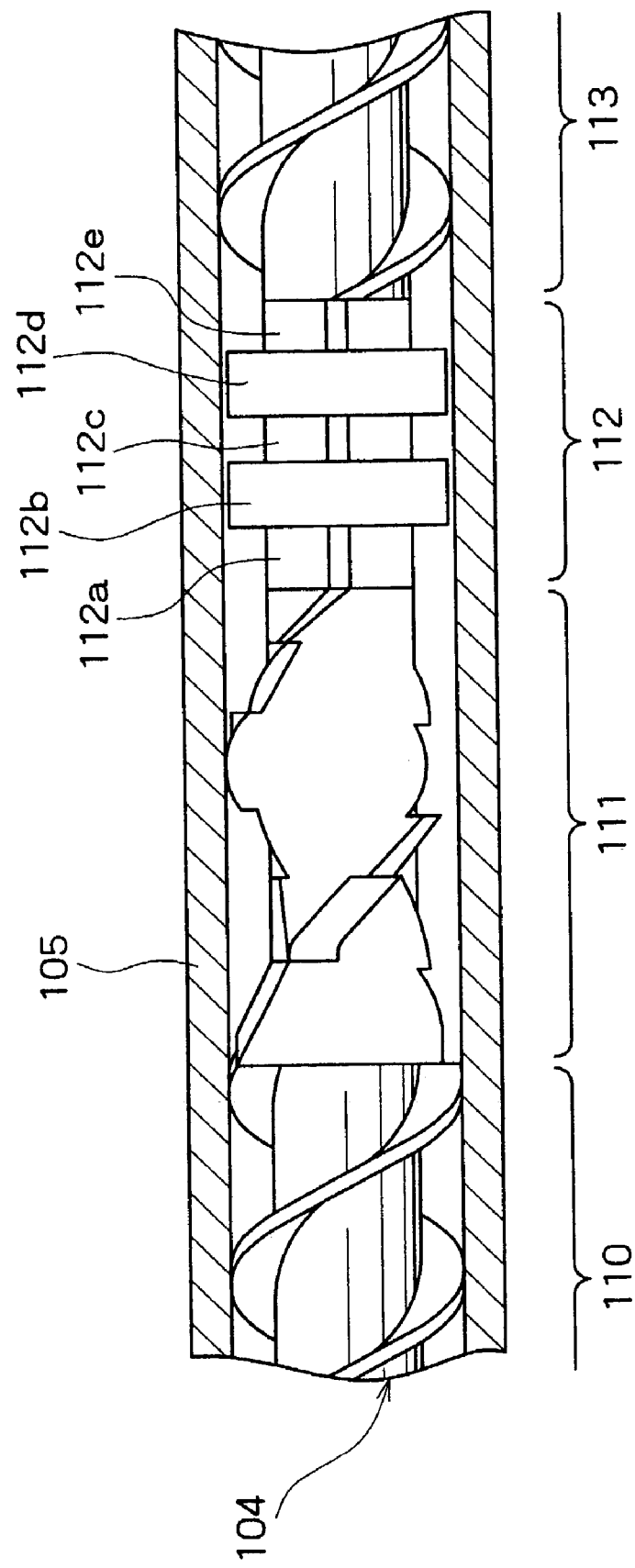
FIG. 9 is a partial side schematic view of the kneading apparatus of a rubber composition of the embodiment of the present invention.

FIG. 9 schematically shows a state in which the first screw section 110, the first kneading blade section 111, the first kneading disc section 112, and the second screw section 113 are incorporated in the screw set 104 as segment members. As can be easily understood from FIG. 9, the first screw section 110 and the first kneading blade section 111, the first kneading blade section 11 and the first kneading disc section 112, and the first kneading disc section 112 and the second screw section 113 change continuously. The first kneading disc section 112 adjacent to the first kneading blade section 111 at the downstream side thereof includes a portion whose axial cross sectional form changes discontinuously (between the segments 112a and 112b).

The structure of the kneading apparatus 101 of the embodiment has been described above. Next, the operation of the kneading apparatus 1 will be described with reference to FIG. 8. First, a sheet-shaped material to be kneaded, including a filler such as carbon black or an additive such as various compound agents, is supplied into the kneading apparatus 101, which is a biaxial kneading extruder, by, for example, the rubber supplier 102. The material is supplied into the chamber 106 from the supply opening 103.

At this time, in the chamber 106, the pair of screw sets 104 engage and rotate in the same direction by the driver 107. The material supplied into the chamber 106 is extruded to each first kneading blade section 111 by the two helical blades of each first screw section 110.

The material extruded towards each of the first kneading blade sections 111 is transported downstream while being kneaded between each first kneading blade section 111 and the inside wall 106a of the chamber. Here, since each first kneading disc section 112 adjacent the first kneading blade section 111 at the downstream side thereof has a portion whose axial cross sectional form changes discontinuously, it resists the transportation of the material being transported downstream. By this, the material fills the space between each first kneading blade section 111 and the inside wall 6a of the chamber so as to build up excessively. At the tip clearances (120a, 120b), the material that has filled the spaces flows and is subjected to a shearing force, and is kneaded so as to be sufficiently mixed and dispersed.

Here, since the material is filled at each first kneading disc section 112 so that the required amount of it is stopped the discontinuous portion of each first kneading disc section 112, the material is not pushed back upstream, so that the material does not build up excessively. Therefore, problems such as the material tending to remain in the chamber 106 ever after kneading, the rubber tending to deteriorate due to high temperature, and the kneading efficiency tending to be reduced do not easily occur. In addition, since the top portions 119 of the helical blades of the first kneading blade sections 111 are cut away, as mentioned above, the problem that the lifetime of the kneading material is reduced due to uneven distribution and building up of the material inside the chamber 106 does not easily occur.

The material kneaded at each first kneading blade section 111 passes each first kneading disc section 112 and is extruded downstream by each second screw section 113. The material extruded downstream by each second screw section 113 reaches each second kneading blade section 114. The second kneading blade sections 114 and the second kneading disc sections 115 perform the same operations on the material as those of the first kneading blade sections 111 and the first kneading disc sections 112. The material which has passed the second kneading disc sections 115 is extruded further downstream by the third screw sections 116, and is lastly discharged from the end 105a as a kneaded material.

Here, in order to describe the advantages of the present invention in more detail, a more detailed description will be given below with reference to an example. The example described below is strictly one example of the present invention.

(Experiment)

The kneading apparatus 101 (shown in FIG. 8), which is a biaxial kneading extruder, of the embodiment was formed with a screw blade structure having only one kneading blade section and one kneading disc section, and an experiment on producing a kneaded material was conducted. In the kneading apparatus 101, the screw diameter was 59 mm, and the ratio (L/D) between the length of a screw set 104 and an outside diameter D of the screw set was 10.8. During continuous kneading, while adjusting the temperature of the barrel so that it was maintained at a substantially fixed temperature near ordinary temperature by passing cooling water through the cooling liquid paths 108 of the barrel 105, the material was kneaded, and the kneaded material was discharged in the form of a lump from the end 105a of the barrel 105.

With the screw rotation speed being 300 rpm, the temperature of the material (rubber) to be supplied being 25° C., and the supplying speed being 200 kg/hr, the Mooney viscosity reduction value and the temperature of the material after kneading (temperature of the kneaded material immediately after it was discharged from the end 5a) and the screw deflection amount of a second screw section were measured (experimental condition ①). For comparison, a kneaded material was produced by a kneading apparatus using a rotor not having its top portion cut away and having a screw lead measuring 3D (experimental condition ②); a kneaded material was produced by a kneading apparatus using a rotor not having its top portion cut away and having a screw lead measuring 3D and using a feed-direction kneading disc (experimental condition ③); a kneaded material was produced by a kneading apparatus using a rotor not having its top portion cut away and having a screw lead measuring 3D and using a returning-direction kneading disc (experimental condition ④). As in the experiment conducted under the experimental condition ①, in these experiments, a Mooney viscosity reduction value and the temperature of the kneaded material were measured. The experimental results are shown in Table 1.

TABLE 1

| Experimental Condition | Mooney Viscosity Reduction Value | Temperature of Kneaded Material | Deviation From Screw Deflection Amount Standard |
|---|---|---|---|
| ① | 16 points | 132° C. | 0.142 mm |
| ② | 19 points | 143° C. | 0.196 mm |
| ③ | 7 points | 124° C. | 0.223 mm |
| ④ | 20 points | 160° C. | 0.092 mm |

As shown in Table 1, in the experimental condition ④ using a returning kneading disc, the degree of kneading (Mooney viscosity reduction value) is the largest and the screw deflection amount is the smallest, but the temperature of the material is high, so that the material may deteriorate. In addition, since a large amount of material remains, the experimental condition ④ has a disadvantage for use. On the other hand, in the experimental condition ③ using a feeding kneading disc, since the amount of material that builds up is small, the temperature of the material is the lowest, but the degree of kneading is small and the screw deflection amount is large, so that it has few advantages for use. In the experimental conditions ① and ② using kneading discs having phases shifted by 90°, both the temperature and the degree of kneading are proper values. The temperature and the Mooney viscosity reduction value can be adjusted based on the rotating speed and the length of the kneading blade section. Under such operation conditions, the screw deflection amount, which is difficult to adjust, is small in the experimental condition ①. Therefore, the experimental condition ① is the most desirable experimental condition, and the effectiveness of the present invention is confirmed.

The thinner each structural small blade of the kneading disc section is, the greater its agitating capability and transportation resistance are. However, since mechanical rigidity is required, in general, each of these small blades is formed with a length of the order of 0.1D to 0.3D. In the example, although a combination of five small blades having a length of 0.2D was used, it is mechanically possible to form phase discontinuous surfaces when at least two blades are used. However, it is believed that approximately five blades are required in order to provide sufficient resistance to transportation of the material. Even if small blades having a length of 0.1D are used, it is expected that basically the same performance is realized. Therefore, it is estimated that the total length of the kneading disc be at least 0.5D.

The foregoing is a description of the kneading apparatus 101 of the second embodiment. According to the kneading apparatus 101 of rubber or a rubber composition, the material being kneaded is prevented from building up excessively inside the chamber and the material can be sufficiently kneaded.

The present invention is not limited to the above-described embodiment, so that, for example, the following modifications may be made.

(1) Although, in the embodiment, kneading rotors having two helical blades are used, even kneading rotors having three helical blades may be similarly used in the present invention.

(2) Although, in the embodiment, two kneading blade sections, the first and second kneading blade sections, are used, even one or three or more kneading blade sections may be used in the present invention.

(3) Although, in the embodiment, three kneading rotors are used in each first kneading blade section and five kneading rotors are used in each second kneading blade section, other numbers of kneading rotors may be used in each first kneading blade section and each second kneading blade section in the present invention.

(4) The forms of the cutaway portions formed in the top portions of the helical blades of the kneading rotors are not limited to those shown in FIG. 5, so that various other forms (in terms of the length, position, number, the tip heights, etc.) may be selected and used in the present invention.

(5) In the embodiment, the other segment members having portions whose axial cross sectional forms change discontinuously and being adjacent to the respective kneading blade sections at the downstream side thereof have a plurality of kneading discs. However, for example, screw sections having helical blades which are formed so that discontinuous portions appear may also be used.

Hereunder, a description of the third embodiment of the present invention will be given with reference to FIGS. 10 to 12.

A continuous kneading extruding apparatus of the embodiment is formed so as to continuously perform operations from kneading to extrusion of soft and hard materials to be kneaded. Here, soft materials include elastomers such as soft vinyl chloride resin in addition to rubber compositions having a Mooney viscosity which is approximately equal to or less than 50 when the temperature is 100° C. Hard materials include elastomers such as hard vinyl chloride resin in addition to rubber compositions having a Mooney viscosity which is approximately equal to or greater than 80 when the temperature is 100° C.

Figure 10:
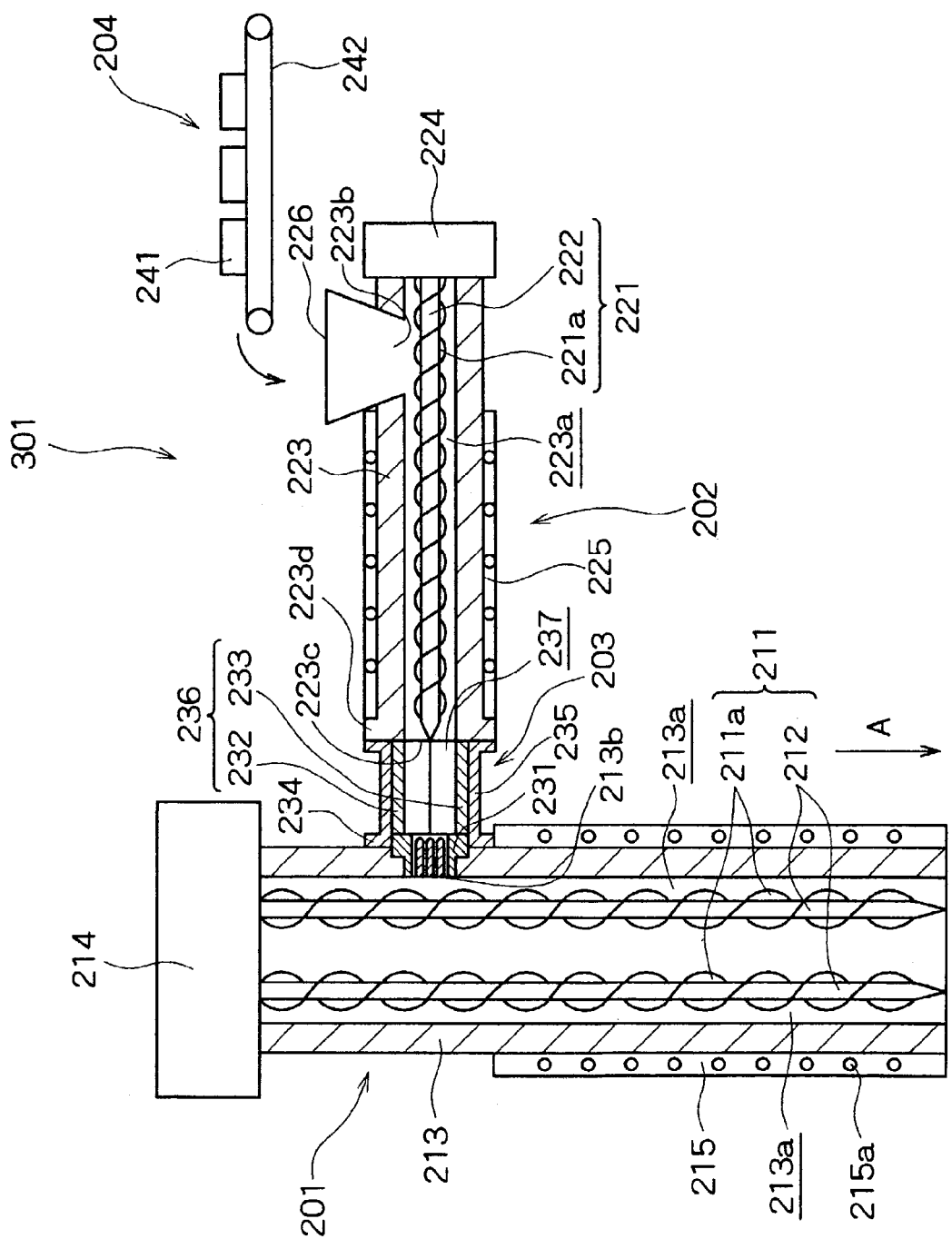
FIG. 10 is a schematic structural view of a continuous kneading extruding apparatus.

As shown in FIG. 10, a continuous kneading extruding apparatus 301 of the embodiment comprises an extruder 201 for extruding a material 241 to be kneaded by making it flow from the upstream side to the downstream side while kneading the material 241; a pusher 202 for supplying the material 241 to the extruder 201; a connecting mechanism 203, which connects the extruder 201 and the pusher 202, for allowing the material 241 to flow in the direction of arrow A; and a material supplier 204 including a conveyor 242 for supplying the material 241 into the pusher 202.

The extruder 201 includes a housing 213 which functions as an outside wall for accommodating the material 241. As shown in FIG. 11, circular cross sectional chambers 213a and 213a are formed symmetrically inside the housing 213. These chambers 213a and 213a are formed so as to extend to both longitudinal-direction ends (both ends in the direction in which the material 241 flows) of the housing 213, with portions of these chambers 213a and 213a being connectable in the widthwise direction of the housing 213 so as to allow the material 241 to move back and forth between both chambers 213a and 213a.

Screws 211 and 211 for causing the material 241 to flow are formed in the respective chambers 213a and 213a. As shown in FIG. 10, each screw 211 comprises a rotary shaft 211b disposed so that its shaft center is in the flow direction A, and a screw blade 211a helically wound upon the outer peripheral surface of the rotary shaft 211b. The inside wall surfaces of the chambers 213a and the respective screw blades 211a are separated by clearances having sizes of the order that allows a shearing force to be applied to the material 241. A screw driver 214 is connected to ends of the rotary shafts 11b at the upstream side in the flow direction A. The screw driver 214 can rotationally drive the rotary shafts 211b (screws 211) at any rotational speed by a speed reducer or a motor (not shown), and closes the upstream ends of the chambers 213a and 213a of the housing 213 in a fluid-tight state.

A temperature adjusting mechanism 215 is provided on the surface of the outer wall of the housing 213. The temperature adjusting mechanism 215 completely covers the housing 213 from the center to the downstream end of the housing 213 in the flow direction A. The temperature adjusting mechanism 215 has heat medium paths 215a connected to a heat medium supplier (not shown). By supplying a heat medium of a predetermined temperature from the heat medium supplier, the temperature adjusting mechanism 215 can adjust the temperature of the housing 213 to a predetermined temperature. Depending upon the type of material and the amount of material the kneading extruding apparatus is required to process, the temperature adjusting mechanism may cover the entire length of the housing from the upstream end to the downstream end thereof.

In the temperature adjusting mechanism 215 provided at the extruder 201, it is recommended that, in accordance with the kneading state of the material 241, one set the temperature of a heat medium as appropriate and perform heating/cooling or a combination thereof. Considering increasing the scope of application to, for example, vinyl chloride resin, it is also necessary to heat the extruder 201, in which case it is recommended that a hot heat medium be supplied to the heat medium paths 215a. Although, in the embodiment, the extruder 201 is a biaxial extruder having a pair of left and right screws 211, it may be a uniaxial type having one screw. When it is necessary to perform a heating operation using a large amount of heat, it is desirable to use an electric heater.

The pusher 202 for supplying the material 241 to the extruder 201 having the above-described structure comprises a housing 223; a screw driver 224 provided at one end (upstream end) of the housing 223; a screw 221, accommodated inside the housing 223, which rotates with a rotary shaft 222 as the center; and a hopper 226 provided at the top surface of the pusher 202.

A circular cross sectional chamber 223a is formed in the housing 223. An opening 223b is formed at one end side of the top surface of the chamber 223a, and a hopper 226 is provided at the opening 223b. The hopper 226 opens so that a surface which defines it widens upwards. The conveyor 242 is provided above the hopper 226, and can supply any amount of the material 241 into the hopper 226.

Figure 11:
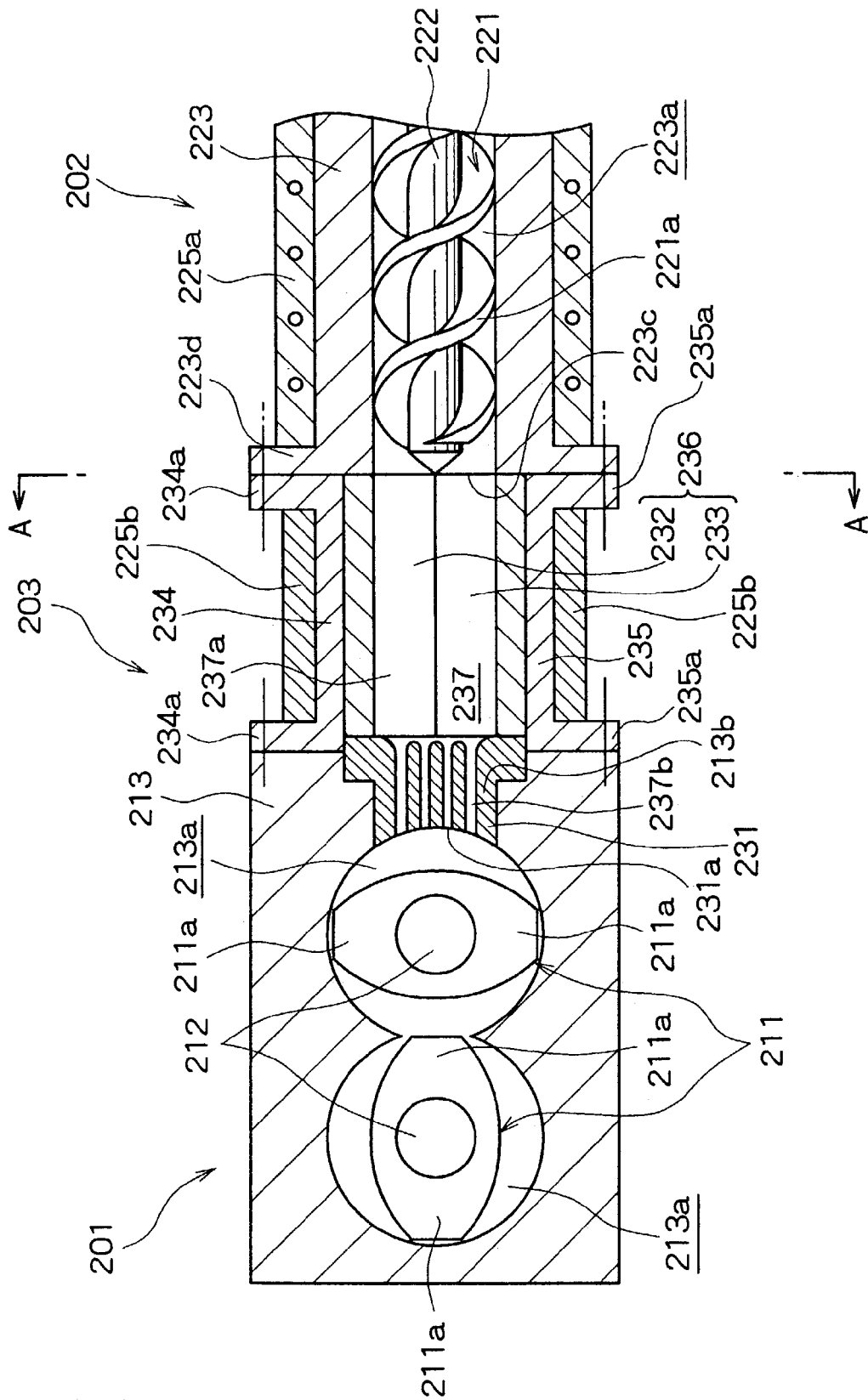
FIG. 11 is a schematic structural view of the main portion of the continuous kneading extruding apparatus.

On the other hand, as shown in FIG. 11, at the other end (downstream end) of the housing 223, a discharge opening 223c which is an opening of the chamber 223a is formed in the central portion and a flange 223d is formed around the discharge opening 223c. The screw 221 is accommodated in the chamber 223a. The screw 221 comprises the rotary shaft 222 and a screw blade 221a helically provided around the rotary shaft 222. As shown in FIG. 10, the screw driver 224 is connected to one end of the rotary shaft 222. The screw driver 224 rotationally drives the screw 221 so as to supply the material 241 towards the discharge opening 223c. It is desirable for the rotation speed of the screw 221 to be a value that allows the material 241 to be supplied at an average supplying speed equal to or greater than 30 mm/s.

The connecting mechanism 203 is connected to an end surface of the flange 223d. As shown in FIG. 11, the connecting mechanism 203 is interposed between the pusher 202 and a supply opening member 231 provided at the opening 213b of the extruder 201. The connecting mechanism 203 comprises a supply path member 236 and outer frame structural members 234 and 235 provided at the outer periphery of the supply member path 236.

Figure 12:
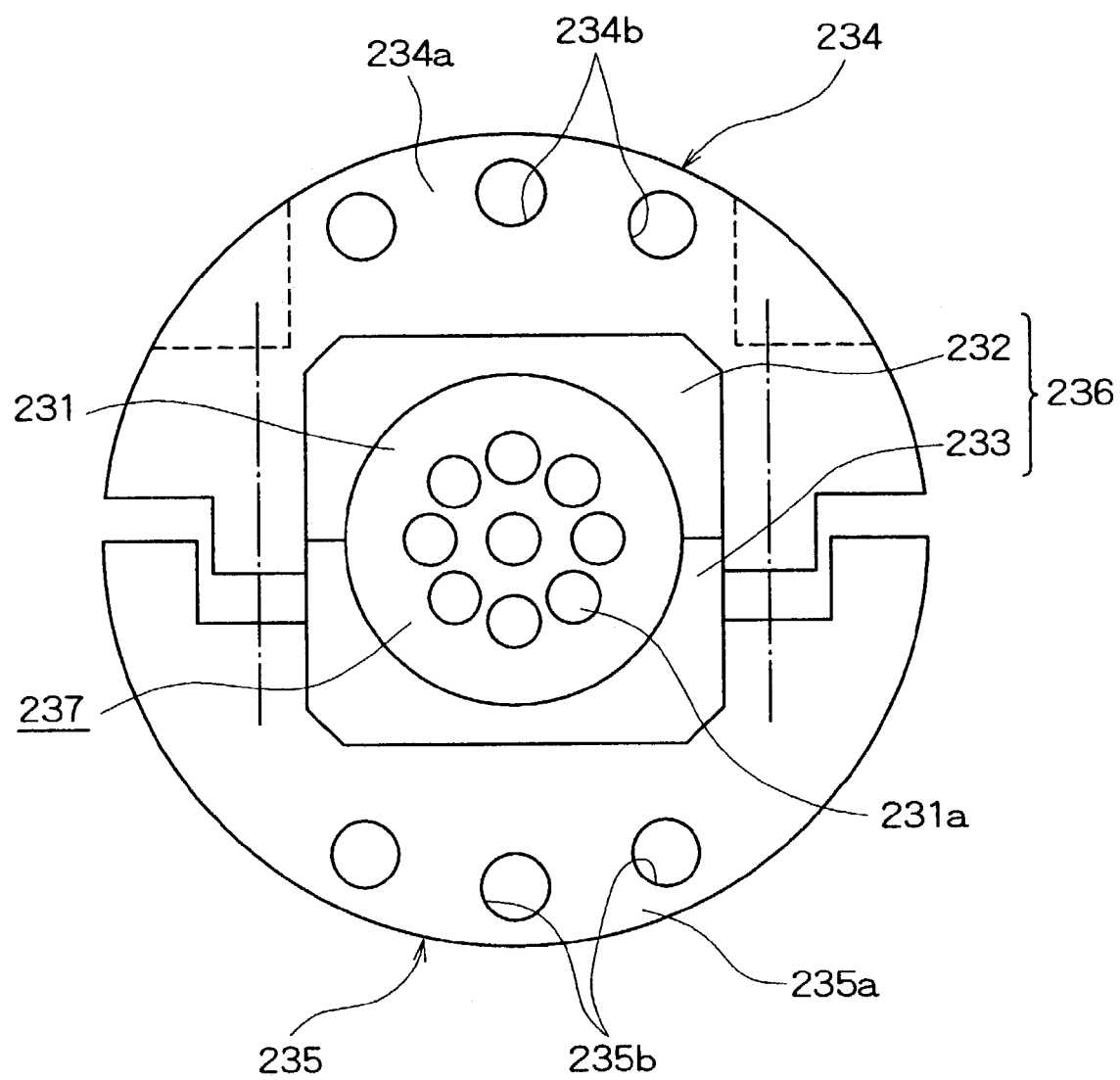
FIG. 12 is a sectional view taken along arrows A—A of FIG. 11.

As shown in FIG. 12, the supply path member 236 comprises a pair of cylindrical members 232 and 233. The cylindrical members 232 and 233 are joined so that they can be separated into two in the vertical direction (radial direction), with a supply path 237 being provided at their inner portions. The supply path 237 is formed with substantially the same cross sectional shape as that of the discharge opening 223c of the chamber 223a of the pusher 202. As shown in FIG. 11, one end of the supply path member 236 is connected to the pusher 202, and the other end thereof is connected to the supply opening member 231 provided at the opening 213b of the extruder 201, so that the material 241 is guided to the extruder 201 from the pusher 202.

The supply path member 236 is secured by the outside frame structural members 234 and 235 so as to maintain the cylindrical form of the joined cylindrical members 232 and 233. As shown in FIG. 12, the outside frame structural members 234 and 235 are formed so that they can be fitted to the supply path member 236 in the vertical direction (radial direction). The outside frame structural members 234 and 235 are joined so that they can be separated into two in the vertical direction (radial direction). Flanges 234a and 235a are provided at both ends of the respective outside frame structural members 234 and 235. A plurality of insertion holes 234b and 235b are formed in the respective flanges 234a and 234b. As shown in FIG. 11, bolts (not shown) are inserted in the insertion holes 234b and the insertion holes 235b of the respective outside frame structural members 234 and 235, so that, by these bolts, the housing 213 of the extruder 201 and the housing 223 of the pusher 202 are connected together. The outside frame structural members 234 and 235 may be secured between the extruder 201 and the pusher 202 by related methods, such as by using bolts, pins, or clamps.

An end surface of the supply opening member 231 is in contact with the supply path member 236 secured by the outside frame structural members 234 and 235. The supply opening member 231 is removably fitted to the opening 213b of a side surface wall of the housing 213. As shown in FIG. 12, the supply opening member 231 has a plurality of supply holes 237b. One end of each supply hole 237b opens to the supply path 237a in the supply path member 236, and the other end thereof has a supply opening 231a which opens to the chamber 213a of the extruder 201. The supply-path-237a-side end portion of each supply hole 237b widens towards the supply path 237a. It is desirable that the diameter $\phi$ of each supply opening 231a be equal to or less than 10 mm. It is desirable that the total cross sectional area of the supply openings 231a be equal to or less than ¼ the cross sectional area of the supply path 237a. It is desirable to previously provide the supply opening member 231 in accordance with the type of material 241 so that, for example, the diameter, number, and arrangement of the supply holes 237b can be easily adjusted to the most suitable diameter, number, and arrangement of the supply holes 237b in accordance with the type of material 241. Removal of the connecting mechanism 203 from between the extruder 201 and the pusher 202 makes it possible to mount the supply opening member 231, having such a structure, to and dismount it from the opening 213b without increasing the distance between the extruder 201 and the pusher 202.

In the embodiment, heaters 225a and 225b are provided on the outer peripheral surface of the housing 223 and the outer peripheral surface of the connecting mechanism 203, respectively. The heater 225a covers the whole housing 223 from the flange 223d to the other end. The heater 225b is divided in correspondence with the number of divisions of the connecting mechanism 203 and substantially covers the outer peripheral surface of the connecting mechanism 203. The heaters 225a and 225b are connected to a power supply device (not shown). When electrical power is supplied from the power supply device, the heaters 225a and 225b produce heat in order to heat the housing 223 and the connecting mechanism 203 to a predetermined temperature. The means for heating the pusher 202 and the connecting mechanism 203 are not limited to heaters, so that, for example, a jacket which allows heating fluid to flow inside thereof may be used. Although, in the embodiment, the material is supplied into the hopper or supplier by the conveyor, it may be supplied by other known means, such as a screw continuous feeder or a vibratory feeder. Although the pusher 202 is described as being a uniaxial type, it may be, for example, a gear pump type, a biaxial uniaxial extruder, or a biaxial taper type extruder.

A description of the operation of the continuous kneading extruding apparatus 301 of the above-described structure will be described.

For preparation, a type of supply opening member 231 having supply openings 231a suitable for the material 241 is selected, and the selected type of supply opening member 231 is fitted to the opening 213b of the housing 213 of the extruder 201. Here, since the connecting mechanism 203 does not exist between the extruder 201 and the pusher 202, the space to be occupied by the connecting mechanism 203 can be used to mount the supply opening member 231.

The preparation steps will be described in more detail. First, after the lower outside frame structural member 235 has been consecutively connected to the extruder 201 and the pusher 202, the supply opening member 231 is fitted into the opening 213b of the housing 213. When this operation is completed, the upper and lower cylindrical members 232 and 233 are separably brought into contact with each other in order to form the supply path member 236. The supply path member 236 is inserted between the supply member 231 and the pusher 202, and placed upon the lower outside frame structural member 235. Thereafter, the upper outside frame structural member 234 is mounted so as to cover the outer peripheral surfaces (top and side surfaces) of the supply path member 236, after which it is secured with each bolt so as to maintain its mounting state.

As mentioned above, the supply path member 236 has a vertically divisible structure. Accordingly, since, when the upper outside frame structural member 235 is removed, the upper cylindrical member 232 is not secured, it can be easily removed, so that, thereafter, any material remaining in the supply path member 236 can be easily removed. Afterwards, the lower cylindrical member 233 can be easily removed, so that it can be replaced the supply opening member 231 without moving the pusher 202. If the supply path member 236 does not have a vertically divisible structure, the material 241 remaining in the supply path member 236 and the material 241 remaining in the supply opening member 231 are stuck, so that, in order to take out the supply path member 236, it is necessary to shear and cut the remaining material between the supply path member 236 and the supply opening member 231, so that a very large force is required. If the pusher 202 may be moved, the supply path member 236 does not need to have a divisible structure. After the whole pusher 202 and connecting mechanism 203 have been moved, the supply opening member 231 can be removed, so that the supply opening member 231 can be easily replaced and cleaned.

When the mounting (fitting) operation of the supply opening member 231 has been completed, the supply path member 236 is inserted between an end surface of the supply opening member 231 and an end surface of the housing 223 of the pusher 202. Here, it is possible to form the supply opening member 231 by individually inserting the cylindrical members 232 and 233, which are divided into two, and integrally joining them, so that the supply opening member 231 can be easily set. Thereafter, the outside frame structural members 234 and 235 are mounted so as to cover the outer peripheral surface of the supply path member 236, and are secured to the housing 213 of the extruder 201 and the housing 223 of the pusher 202 with bolts (not shown). By this, the connecting mechanism 203 is interposed between the extruder 201 and the pusher 202, and the supply opening member 231 is reliably secured to the housing 213 of the extruder 201 by the connecting mechanism 203. When the specification of the supply opening member 321 is switched to a different one, the supply opening member 231 can be easily and quickly switched to a different supply opening member 231 without moving the extruder 201 and the pusher 202 by carrying out the above-described operations in the reverse order to remove the connecting mechanism 203 and the supply opening member 231 in that order.

Next, as shown in FIG. 10, electrical power is supplied to the screw driver 224 of the pusher 202 in order to rotate the screw 221 by rotating the rotary shaft 222. In addition, electrical power is supplied to the screw driver 214 of the extruder 201 in order to rotate the screws 211 and 211 by rotating the rotary shafts 212 and 212. At this time, the rotating speeds of the screws 211 and 211 and the screw 221 are set at predetermined values. When electrical power is supplied to the heaters 225a and 225b, the temperatures of the housing 223 and the connecting mechanism 203 are increased to predetermined temperatures, and the housing 213 is cooled to a predetermined temperature by supplying a cooling medium to the heat medium paths 215a of the temperature adjusting mechanism 215.

When the rotation of all of the screws 221, 211, and 211 becomes steady, the conveyor 242 of the material supplier 204 is driven to transport the material 241. The material 241 transported from the material supplier 204 drops downward from a transportation end and is supplied into the opening of the hopper 226.

The material 41 supplied into the hopper 226 moves forward into the chamber 223a from the opening 223b and is sent towards the discharge opening 223c while being kneaded by the rotating screw 221. At this time, since the temperature of the housing 223 is increased by the heater 225, the material 241 is vigorously heated and softened by the heat from the housing 223 in addition to by friction heat produced during kneading. As shown in FIG. 11, the material 241 is extruded successively from the discharge opening 223c by the screw 221, and moves into the supply path 237a. While being heated by the heater 225b, the material 241 flows into each of the supply holes 237b and is continuously extruded to the chambers 213a of the extruder 201 from the supply openings 231a.

When the material 241 which has been softened as mentioned above flows into the chambers 213a from each of the supply openings 231a, the materials 241 are cut by the screw blades 211a because the screw blades 211a swing along the end surface of the supply opening member 231 in the vicinity thereof in predetermined clearances. Here, since the materials 241 each have small cross sectional areas that equal the opening areas of the supply openings 231a, the materials 241 are cut by the screw blades 211a more easily than the case where the material 241 has a large cross sectional area that equals the opening area of the opening 213b. Therefore, even if a large amount of material 241 enters the chambers 213a as a whole through the plurality of supply openings 231a, the pressure acting upon the screw blades 211a does not become excessively high. By this, the flexing of the screws 211 is kept to a minimum, so that it is possible to prevent, for example, rubbing of the screw blades 211a against the inside wall surface of the housing 213 (chambers 213a).

Thereafter, the materials 241 which have flown into the chambers 213a are sent downstream while being kneaded by the screws 211 and 211. At this time, the temperature adjusting mechanism 215 adjusts the temperature of the softened materials 241 to a temperature of the order not causing deterioration of the materials 241 by heat. The materials 241 are extruded by the extruder 201 by being subjected to a desired kneading operation/reaction/degassing operation.

As described above, in the continuous kneading extruder 201 used in the embodiment, the materials 241 which have been forcefully supplied into the housing 213 from the pusher 202 through the supply openings 231a which open towards the inside of the housing 213 of the extruder 201 are sent out while being kneaded by rotation of the screws 211 inside the housing 213, and the plurality of supply openings 231 are formed so as to open in the vicinity of the screw blades 211a of the screws 211. By this, when the materials 241 are supplied into the housing 213 from the plurality of supply openings 231a, the materials 241 can be cut by the screw blades 211a, so that it is possible to prevent the materials 241 from exerting a large pushing force upon the end surfaces of the screw blades 211a. By this, since the screws 211 are not flexed by a large pushing force, it is possible to prevent, for example, the screw blades 211a from rubbing against the inside wall surface of the housing 213.

Although, in the embodiment, the case where the continuous kneading extruder 201 and the pusher 202 are connected by the connecting mechanism 203 has been described, the present invention is not limited thereto. In other words, the pusher 202 may be directly connected to the housing 213, so that the material 241 is supplied through a plurality of supply openings in the side wall of the housing 213.

The continuous kneading extruder 201 used in the embodiment, in which the materials 241 forcefully supplied from the pusher 202 into the housing 213 through the supply openings 231a opening towards the housing 213 of the extruder 201 are sent out while being kneaded by rotation of the screws 211 inside the housing 213, comprises a removably provided connecting mechanism 203 which connects the pusher 202 and the housing 213. The connecting mechanism 203 is formed so that the supply opening member 231, including the plurality of supply openings 231a which open in the vicinity of the screw blades 211a of the screws 211, can be divided.

By this, when the materials 241 are supplied into the housing 213 from the plurality of supply openings 231a of the supply opening member 231, the materials 241 can be cut by the screw blades 211a, so that it is possible to prevent the materials 241 from exerting a large pushing force upon the end surfaces of the screw blades 211a. By this, since the screws 211 are not flexed by a large pushing force, it is possible to prevent, for example, the screw blades 211a from rubbing against the inside wall surface of the housing 213.

When the supply opening member 231 is changed, it is possible to change parameters, such as the arrangement, shape, and size of the supply openings 231a, for properly cutting the supplied materials 241 by the screw blades 211a. Therefore, a supply opening member 231 having supply openings 231a properly corresponding to the manufacturing conditions and physical properties of the material 241 can be formed in the housing 213.

Although, in the embodiment, the case where the supply path member 236 is secured by the outside frame structural members 234 and 235 has been described, the present invention is not limited thereto. In other words, the member having supply openings is one which can be mounted to and dismounted from the housing 213. The cylindrical member 232 and the outside frame structural member 234 and the cylindrical member 233 and the outside frame structural member 235 may be integrally formed. Alternatively, the supply path member 236 and the outside frame structural members 234 and 235 may be an integrally formed cylindrical member, and both ends of the cylindrical member may be secured to the extruder and the pusher by any method.

The connecting mechanism 203 used in the embodiment is interposed between the supply opening member 231 and the pusher 202, and includes the supply path member 236 which can be divided into a plurality of parts parallel to the direction of flow of the material 241. By this, even if the gap between the pusher 202 and the housing 213 is not enlarged, since the supply path member 236 can be divided into parts and removed, it is possible to use the space provided after removing the supply path member 236 to mount the supply opening member 231 and remove it from the housing 213. However, the present invention is not limited thereto, so that, as long as at least one of the pusher and the extruder can be moved, the supply opening member 231 may be integrally formed with the connecting mechanism.

Although, in the embodiment, the case where the supply path member 236 can be divided into two parts in the vertical direction is described, the present invention is not limited thereto. More specifically, it may be one which can be divided into three or more parts parallel to the direction of flow of the material 241.

In the continuous kneading extruder 201 used in the embodiment, the diameter of each supply opening 231a is from 6 mm to 10 mm inclusive, the step formed by the inside surface of the housing 213 and the housing-213-side end surface defining the supply opening member 231 is equal to or less than 0.3 mm in the outward direction of the housing, and the supply speed of the material 241 passing through each supply opening 231a is equal to or greater than 30 mm/s. By this, it is possible to satisfactorily prevent rubbing of the screw blades 211a against the housing 213.

Kneading blade sections can be mounted in the screw 211 for kneading the material to be kneaded by shearing the material in tip clearances and a wedge-shaped space between an inside wall of the housing 213 and the kneading blade section. Further, the tip clearance of the downstream-side kneading section among the kneading sections can be narrower than the tip clearance of the upstream-side kneading section among the kneading sections, the upstream and downstream sides being defined in terms of the direction in which the material to be kneaded is extruded, as provided in the first embodiment.

A continuous kneading extruding apparatus 301 having a supply opening member 231 used in the embodiment mounted thereto (Nos. 1 and 3) and, for comparison, a continuous kneading extruding apparatus 301 not having a supply opening member 231 used in the embodiment mounted thereto (No. 2) were operated. The results of confirmation of the operations and advantages are given in Table 2. In Nos. 1 and 3, when the supply opening member 231 used in the embodiment was mounted to the housing 213 of the extruder 201, the supply-opening-side end surface of the supply opening member 231 was disposed 0.3 mm outward from the inside wall of the housing 213.

TABLE 2

| | MATERIAL TO BE KNEADED | | PUSHER | | CONNECTING MECHANISM | SUPPLY OPENING MEMBER | | | EXTRUDING ELEMENT | | RESULT |
|---|---|---|---|---|---|---|---|---|---|---|---|
| | | | | | | OPENING DIAMETER × | | | | | |
| NO. | SUPPLY TEMPERATURE (° C.) | MOONEY VISCOSITY $ML_{1+4}$ (100° C.) | SUPPLY AMOUNT (kg/hr) | SET TEMPERATURE (° C.) | SET TEMPERATURE (° C.) | NUMBER OF SUPPLY OPENINGS | OPENING AREA (mm²) | FLOW SPEED (mm/s) | ROTATING SPEED (mm/s) | DISCHARGE TEMPERATURE (° C.) | INTERFERENCE NOISE |
| 1 | 100 | APPROX. 100 | 50 | 120 | 120 | φ 6 × 14 | 396 | 35 | 300 (100) | APPROX. 150 | NO |
| 2 | 100 | APPROX. 100 | 50 | 120 | 120 | φ 59 × 1 | 2734 | 5 | 300 (100) | APPROX. 150 | YES |
| 3 | 100 | APPROX. 60 | 50 | 120 | 120 | φ 6 × 14 | 396 | 35 | 300 (100) | APPROX. 150 | NO |

When the supply temperatures of the respective materials, the supply amount and set temperature of the pusher, the set temperature of the connecting device, the flow amount from the supply opening member 231 to the extruder 201, and the rotating speed of the extruder 201 and the discharge temperatures of the materials were made the same, hard rubber compositions having a Mooney viscosity $ML_{1+4}$ (100° C.) of approximately 100 were processed. From Nos. 1 and 2, when the material was supplied into the housing 213 of the extruder 201 from a single opening (No. 2), there was screw interference noise from the extruder 201, but, when the material was supplied from the plurality of supply openings 231a (No. 1), no interference noise was confirmed. From this, it was confirmed that, when a plurality of supply openings 231a for supplying the material to the extruder 201 were formed as in the continuous kneading extruding apparatus 301 of the embodiment, they functioned to restrict flexing of the screws 213 caused by a large pushing force of the material.

The continuous kneading extruding apparatus was operated under the same operation conditions as those of No. 1, except that rubber composition having a Mooney viscosity $ML_{1+4}$ (100° C.) of approximately 60 was processed. No interference noise was confirmed. From this, it was confirmed that the continuous kneading extruding apparatus 301 of the embodiment could be used to process materials having a wide range of viscosities.

In Nos. 1 and 3, there were no variations in the discharge amount of the extruder 201. From this, it was confirmed that, as long as a side end surface defining each supply opening 231a of the supply opening member 231 was disposed within at least 0.3 mm outward from the inside wall of the housing 213 when the supply opening member 231 used in the embodiment was mounted to the housing 213 of the extruder 201, the material did not built up in a recess defined by the stepped portion formed by the inside wall of the housing and the supply opening member 231. Therefore, the recess did not function as a buffer which caused the material supplied to the extruder 201 to temporarily build up there. Consequently, it was confirmed that the amount of material supplied to the extruder 201 was stably maintained, and that the supply of an improper amount of material at the extruder 201 could be restricted. When the continuous kneading extruding apparatus 301 was operated under the same conditions as those of Nos. 1 to 3 except that the rotating speed of the extruder 201 was 100 rpm, the results were the same as those obtained when the rotating speed was 300 rpm.

We claim:

1. A kneading apparatus for kneading by fluidizing a material to be kneaded under a shearing force to obtain a kneaded product in a desired kneaded state comprising a kneading extruder, said kneading extruder comprising:
    a barrel having a chamber, said chamber being a tubular hollow;
    a biaxial screw set, said biaxial screw rotating for extruding the material to be kneaded downstream inside said chamber; and
    a kneading blade section mounted in said screw set for kneading the material to be kneaded by shearing the material in tip clearances and a wedge-shaped space between an inside wall of said chamber and said kneading blade section, wherein the tip clearances become progressively narrower from the upstream side to the downstream side in the direction of extrusion of the material,
    wherein said kneading blade section comprises a helical blade having a partly cut away top portion and a length in the axial direction which is equal to or greater than the outside diameter of said screw set, and said kneading blade section is, at the downstream side, adjacent to another segment member having a portion whose axial cross sectional form changes discontinuously, and wherein said kneading blade section has a screw lead having a length which is equal to or greater than five times the outside diameter of said screw set.

2. The kneading apparatus according to claim 1, wherein a rotor segment having two or three helical blades is used as said kneading blade section, and wherein the tip clearance between the inside wall of said chamber and at least one helical blade is narrower than the tip clearance between the inside wall of said chamber and the other (another) helical blade.

3. The kneading apparatus according to claim 1, further comprising a cooling path provided inside said barrel and around said chamber.

4. The kneading apparatus according to claim 1, further comprising a pusher for forcefully supplying the material to be kneaded into said chamber, wherein a plurality of supply openings is provided in said barrel towards the inside of said chamber and in the vicinity of a blade of said screw set.

5. The kneading apparatus according to claim 1, further comprising:
    a pusher for forcefully supplying the material to be kneaded into said chamber; and
    a removably provided connecting mechanism for connecting said pusher and said barrel, said connecting mechanism having a supply opening member integrally or separably formed thereat, said supply opening member having the plurality of supply openings opening in the vicinity of a blade of said screw set.

6. The kneading apparatus according to claim 1, further comprising: discharge ports provided at a plurality of positions of said barrel, for discharging the kneaded product; and a discharge position selecting means for selecting one of the plurality of discharge ports so as to discharge the kneaded product from only a selected discharge port.

7. The kneading apparatus according to claim 1, further comprising: charging ports provided at a plurality of positions of said barrel, for supplying the material to be kneaded into said chamber; and a feeder for supplying the material to be kneaded through a selected one of said plurality of charging ports.

8. A kneading apparatus for kneading by fluidizing a material to be kneaded under a shearing force to obtain a kneaded product in a desired kneaded state comprising a kneading extruder, said kneading extruder comprising:
    a barrel having a chamber, said chamber being a tubular hollow;
    a biaxial screw set, said biaxial screw rotating for extruding the material to be kneaded downstream inside said chamber; and
    a kneading blade section mounted in said screw set for kneading the material to be kneaded by shearing the material in tip clearances and a wedge-shaped space between an inside wall of said chamber and said kneading blade section, wherein the tip clearances become progressively narrower from the upstream side to the downstream side in the direction of extrusion of the material,
    wherein said kneading blade section comprises a helical blade having a partly cut away top portion and a length in the axial direction which is equal to or greater than the outside diameter of said screw set, and said kneading blade section is, at the downstream side, adjacent to another segment member having a portion whose axial cross sectional form changes discontinuously, wherein said another segment member adjacent to said kneading blade section at the downstream side has a length in the axial direction which is equal to or greater than ½ of the outside diameter of said screw set, and wherein a plurality of segments having blades whose top portions are parallel to the axis of said screw set are combined so that their axial cross sectional forms are alternately shifted by 90° from the axial center of said screw set.

9. A kneading apparatus for kneading by fluidizing a material to be kneaded under a shearing force to obtain a kneaded product in a desired kneaded state comprising a kneading extruder, said kneading extruder comprising:
   a barrel having a chamber, said chamber being a tubular hollow;
   a biaxial screw set, said biaxial screw rotating for extruding the material to be kneaded downstream inside said chamber;
   a kneading blade section mounted in said screw set for kneading the material to be kneaded by shearing the material in tip clearances and a wedge-shaped space between an inside wall of said chamber and said kneading blade section, wherein the tip clearances become progressively narrower from the upstream side to the downstream side in the direction of extrusion of the material;
   a pusher for forcefully supplying the material to be kneaded into said chamber; and
   a removably provided connecting mechanism for connecting said pusher and said barrel, said connecting mechanism having a supply opening member integrally or separably formed thereat, said supply opening member having the plurality of supply openings opening in the vicinity of a blade of said screw set,
   wherein said connecting mechanism has said supply opening member separably formed thereat, and has a supply path member which is interposed between said supply opening member and said pusher and which can be divided into a plurality of parts parallel to a direction in which the material to be kneaded flows.

10. A kneading apparatus for kneading by fluidizing a material to be kneaded under a shearing force to obtain a kneaded product in a desired kneaded state comprising a kneading extruder, said kneading extruder comprising:
   a barrel having a chamber, said chamber being a tubular hollow;
   a biaxial screw set, said biaxial screw rotating for extruding the material to be kneaded downstream inside said chamber;
   a kneading blade section mounted in said screw set for kneading the material to be kneaded by shearing the material in tip clearances and a wedge-shaped space between an inside wall of said chamber and said kneading blade section, wherein the tip clearances become progressively narrower from the upstream side to the downstream side in the direction of extrusion of the material;
   a pusher for forcefully supplying the material to be kneaded into said chamber; and
   a removably provided connecting mechanism for connecting said pusher and said barrel, said connecting mechanism having a supply opening member integrally or separably formed thereat, said supply opening member having the plurality of supply openings opening in the vicinity of a blade of said screw set,
   wherein a barrel-side end surface of said supply opening member is within 0.3 mm outward from an inside surface of said barrel.

11. A kneading apparatus for kneading by fluidizing a material to be kneaded under a shearing force to obtain a kneaded product in a desired kneaded state comprising a kneading extruder, said kneading extruder comprising:
   a barrel having a chamber, said chamber being a tubular hollow;
   a biaxial screw set, said biaxial screw set comprising two screw sets rotating for extruding the material to be kneaded downstream inside said chamber; and
   at least two kneading blade sections mounted in each said screw set in an array of separate sections arranged along a direction of extrusion of the material and comprising means for kneading the material to be kneaded by shearing the material in tip clearances and a wedge-shaped space between an inside wall of said chamber and said kneading blade section, wherein the tip clearances become respectively narrower from one of said kneading blade sections to the next kneading blade section for all of the at least two kneading blade sections, as taken from an upstream side to a downstream side in the direction of extrusion of the material,
   wherein for each of said at least two kneading blade sections, the tip clearances in said kneading blade section become narrower from an upstream side of the kneading blade section to a downstream side of the kneading blade section in the direction of extrusion of the material.

12. A kneading apparatus for kneading by fluidizing a material to be kneaded under a shearing force to obtain a kneaded product in a desired kneaded state comprising a kneading extruder, said kneading extruder comprising:
   a barrel having a chamber, said chamber being a tubular hollow;
   a biaxial screw set, said biaxial screw set comprising two screw sets rotating for extruding the material to be kneaded downstream inside said chamber; and
   at least two kneading blade sections mounted in each said screw set in an array of separate sections arranged along a direction of extrusion of the material and comprising means for kneading the material to be kneaded by shearing the material in tip clearances and a wedge-shaped space between an inside wall of said chamber and said kneading blade section, each of said kneading blade sections having a low tip section and a high tip section,
   wherein the tip clearances in the low tip section become respectively narrower from one of said kneading blade sections to the next kneading section for all of the at least two kneading blade sections, as taken from an upstream side to a downstream side in the direction of extrusion of the materials,
   wherein each of said at least two kneading blade sections has a rotor segment having a twist angle to extrude the material to be kneaded downstream, and said at least two kneading sections are different in the twist angle.

13. The kneading apparatus according to claim 12, wherein for each of said kneading blade sections, the tip clearance in said kneading blade section becomes narrower from an upstream side of said kneading blade section to a downstream side of said kneading blade section in the direction of extrusion of the material.

14. A kneading apparatus for kneading by fluidizing a material to be kneaded under a shearing force to obtain a kneaded product in a desired kneaded state comprising a kneading extruder, said kneading extruder comprising:
- a barrel having a chamber, said chamber being a tubular hollow;
- a biaxial screw set, said biaxial screw set comprising two screw sets rotating for extruding the material to be kneaded downstream inside said chamber; and
- at least two kneading blade sections mounted in each said screw set in an array of separate sections arranged along a direction of extrusion of the material and comprising means for kneading the material to be kneaded by shearing the material in tip clearances and a wedge-shaped space between an inside wall of said chamber and said kneading blade section, each of said kneading blade sections having a low tip section and a high tip section,
- wherein the tip clearances in the low tip section become respectively narrower from one of said kneading blade sections to the next kneading section for all of the at least two kneading blade sections, as taken from an upstream side to a downstream side in the direction of extrusion of the material,
- wherein each of said at least two kneading blade sections has a rotor segment having a twist angle to extrude the material to be kneaded downstream, and said at least two kneading sections are different in the twist angle.

15. A kneading apparatus for kneading by fluidizing a material to be kneaded under a shearing force to obtain a kneaded product in a desired kneaded state comprising a kneading extruder, said kneading extruder comprising:
- a barrel having a chamber, said chamber being a tubular hollow;
- a biaxial screw set, said biaxial screw set comprising two screw sets rotating for extruding the material to be kneaded downstream inside said chamber; and
- at least two kneading blade sections mounted in each said screw set in an array of separate sections arranged along a direction of extrusion of the material and comprising means for kneading the material to be kneaded by shearing the material in tip clearances and a wedge-shaped space between an inside wall of said chamber and said kneading blade section, wherein the tip clearances become respectively narrower from one of said kneading blade sections to the next kneading blade section for all of the at least two kneading blade sections, as taken from an upstream side to a downstream side in the direction of extrusion of the material,
- wherein each of said at least two kneading blade sections has a rotor segment having a twist angle to extrude the material to be kneaded downstream, and the twist angle of the upstream side is larger than the twist angle of the downstream side in each of said at least two kneading sections.

16. The kneading apparatus according to claim 15, wherein for each of said kneading blade sections, the tip clearance in said kneading blade section becomes narrower from an upstream side of said kneading blade section to a downstream side of said kneading blade section in the direction of extrusion of the material.

17. A kneading apparatus for kneading by fluidizing a material to be kneaded under a shearing force to obtain a kneaded product in a desired kneaded state comprising a kneading extruder, said kneading extruder comprising:
- a barrel having a chamber, said chamber being a tubular hollow;
- a biaxial screw set, said biaxial screw set comprising two screw sets rotating for extruding the material to be kneaded downstream inside said chamber; and
- at least two kneading blade sections mounted in each said screw set in an array of separate sections arranged along a direction of extrusion of the material and comprising means for kneading the material to be kneaded by shearing the material in tip clearances and a wedge-shaped space between an inside wall of said chamber and said kneading blade section, each of said kneading blade sections having a low tip section and a high tip section,
- wherein the tip clearances in the low tip section become respectively narrower from one of said kneading blade sections to the next kneading section for all of the at least two kneading blade sections, as taken from an upstream side to a downstream side in the direction of extrusion of the material,
- wherein each of said at least two kneading blade sections has a rotor segment having a twist angle to extrude the material to be kneaded downstream, and the twist angle of the upstream side is larger than the twist angle of the downstream side in each of said at least two kneading sections.

* * * * *

UNITED STATES PATENT AND TRADEMARK OFFICE
CERTIFICATE OF CORRECTION

PATENT NO.         : 7,244,060 B2                                              Page 1 of 1
APPLICATION NO. : 10/303763
DATED              : July 17, 2007
INVENTOR(S)        : Inoue et al.

It is certified that error appears in the above-identified patent and that said Letters Patent is hereby corrected as shown below:

On the title page, Item (73), the Assignee information is incorrect. Item (73) should read:
-- (73)  Assignee:  Kabushiki Kaisha Kobe Seiko Sho (Kobe Steel, Ltd.),
                    Kobe-shi (JP) --

Signed and Sealed this

Eighteenth Day of September, 2007

JON W. DUDAS
*Director of the United States Patent and Trademark Office*